(12) United States Patent
Kadono

(10) Patent No.: US 6,272,179 B1
(45) Date of Patent: Aug. 7, 2001

(54) IMAGE CODING APPARATUS, IMAGE DECODING APPARATUS, IMAGE CODING METHOD, IMAGE DECODING METHOD, AND DATA STORAGE MEDIUM

(75) Inventor: Shinya Kadono, Kobe (JP)

(73) Assignee: Matsushita Electric Industrial Company, Limited, Osaka (JP)

( * ) Notice: Subject to any disclaimer, the term of this patent is extended or adjusted under 35 U.S.C. 154(b) by 0 days.

(21) Appl. No.: 09/263,202

(22) Filed: Mar. 5, 1999

(30) Foreign Application Priority Data

Mar. 5, 1998 (JP) .................................................. 10-053205

(51) Int. Cl.[7] .............................. H04N 7/12; H04B 1/66
(52) U.S. Cl. ...................................................... 375/240.16
(58) Field of Search ............................... 375/240, 240.08, 375/240.09, 240.1, 240.11, 240.12, 240.13, 240.14, 240.16; 382/166, 167, 232, 236, 238, 240, 241, 243; 348/416.1, 415.1, 414.1, 413.1, 412.1, 400, 403.1; H04B 1/66; H04N 7/12

(56) References Cited

U.S. PATENT DOCUMENTS

| | | | |
|---|---|---|---|
| 5,448,297 | * 9/1995 | Alattar et al. | 348/415 |
| 5,805,227 | * 9/1998 | Gi-Hwan | 348/416.1 |
| 5,818,531 | * 10/1998 | Yamaguchi et al. | 348/403.1 |
| 5,978,034 | * 11/1999 | Hosaka | 348/416.1 |
| 6,049,631 | * 4/2000 | Kim | 382/239 |
| 6,052,414 | * 8/2000 | Lee et al. | 375/240 |
| 6,108,449 | * 8/2000 | Sekiguchi et al. | 382/236 |
| 6,122,318 | * 9/2000 | Yamaguchi et al. | 375/240 |
| 6,134,271 | * 10/2000 | Nakaya et al. | 375/240 |

FOREIGN PATENT DOCUMENTS

| | | |
|---|---|---|
| 0 703 704 | 3/1996 | (EP) . |
| 0 910 043 | 4/1999 | (EP) . |
| 04288790 | 10/1992 | (JP) . |
| 06284415 | 10/1994 | (JP) . |

OTHER PUBLICATIONS

OsterMann, B., Difference between an ogject–based ananlysis–synthesis coder and block–based hybrid coder, Image Processing, 1995. Proceedings., International Conference on, vol. 2, pp. 398–401.*

Gerken, P., Object–based analysis–synthesis coding of image sequences at very rates, Circuit and System for Video Technology, IEEE Transactions on, vol. 4, Jun., 1994, pp. 228–235.*

* cited by examiner

Primary Examiner—Chris Kelley
Assistant Examiner—Tung Vo
(74) Attorney, Agent, or Firm—Wenderoth, Lind & Ponack, L.L.P.

(57) ABSTRACT

An image coding apparatus which performs an adaptive coding process in macroblock units each comprising a predetermined number of pixels into which the image space is divided, comprises: a color motion vector coding unit for coding either a frame-basis color motion vector or a field-basis color motion vector of a target macroblock to be coded which is used in either the frame-by-frame motion compensation coding process or the field-by-field motion compensation coding process for an interlaced color signal, based on its prediction value; and a shape motion vector coding unit for coding a frame-basis shape motion vector of the target macroblock which is used in the frame-by-frame motion compensation coding process for an interlaced shape signal, based on a prediction value obtained from a color motion vector and a shape motion vector of a coded macroblock.

18 Claims, 16 Drawing Sheets

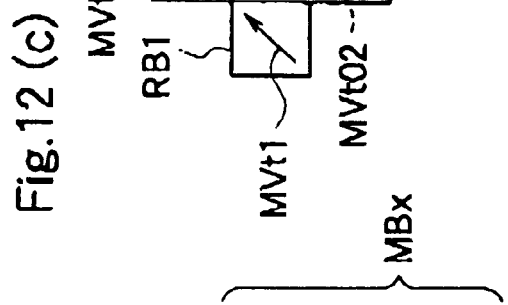
Fig.12 (c)
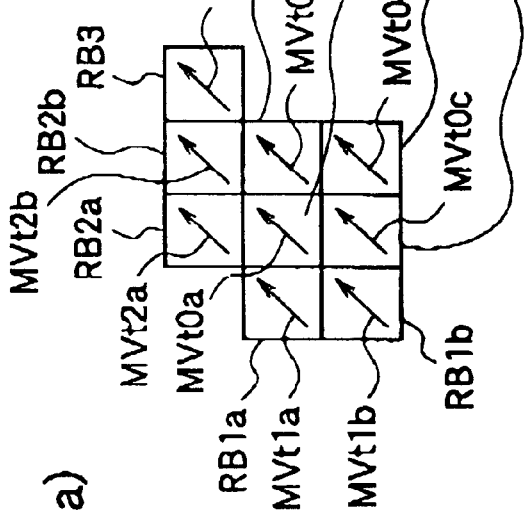
Fig.12 (d)
Fig.12 (a)
Fig.12 (b)

IMAGE CODING APPARATUS, IMAGE DECODING APPARATUS, IMAGE CODING METHOD, IMAGE DECODING METHOD, AND DATA STORAGE MEDIUM

FIELD OF THE INVENTION

The present invention relates to an image coding apparatus, an image decoding apparatus, an image coding method, an image decoding method, and a data storage medium. More particularly, the present invention relates to an apparatus and a method for coding a motion vector (shape motion vector) of a shape signal indicating a shape of an object included in an image on a frame, an apparatus and a method for decoding a coded signal obtained by coding the shape motion vector, and a data storage medium for storing an image processing program for coding or decoding the shape motion vector by software.

BACKGROUND OF THE INVENTION

In recent years, we have greeted the age of multimedia in which audio, video and other data are integrally handled, and the conventional information media (i.e., means for transmitting information media), such as newspapers, magazines, radios, and telephones, have been adopted as the subjects of multimedia. Generally, "multimedia" means to represent, not only characters, but also diagrams, speeches, and especially images simultaneously in relation with each other. In order to handle the conventional information media as the subjects of multimedia, it is necessary to transform the information into a digital format.

When the quantity of data possessed by each information medium described above is estimated as the quantity of digital data, in case of characters, the data quantity for each character is 1~2 byte. However, in case of speech, the data quantity is 64 Kbits per second (quality for telecommunication) and, in case of moving picture, it is more than 100 Mbits per second (quality for current television broadcasting). So, as for the information media described above, it is not practical to handle such massive data as it is in the digital format. For example, although visual telephones have already been put to practical use by ISDN (Integrated Services Digital Network) having a transmission rate of 64 Kbps–1.5 Mbps, it is impossible to transmit an image of a television camera as it is by the ISDN.

So, data compression technologies are demanded. In case of visual telephones, the moving picture compression technologies standardized as H.261 and H.263 by ITU-T (International Telecommunication Union-Telecommunication Sector) are employed. Further, according to the data compression technology based on MPEG1, it is possible to record image data, together with audio data, in an ordinary music CD (compact disk).

MPEG (Moving Picture Experts Group) is an international standard of data compression for data of a moving picture (an image signal of a moving picture). In MPEG1, data of a moving picture is compressed to 1.5 Mbps, i.e., data of a television signal is compressed to about 1/100. Since the transmission rate to which MPEG1 is directed is limited to about 1.5 Mbps, MPEG2 is standardized to meet the demand for higher image quality. In MPEG2, data of a moving picture is compressed to 2~15 Mbps.

Under the existing circumstances, standardization of MPEG4 is now proceeded by the working group for standardization of MPEG1 and MPEG2 (ISO/IEC JTC1/SC29/WG11). MPEG4 enables coding and signal operation in object units, and thereby realizes new functions required in the age of multimedia. MPEG4 has originally aimed at standardization of a coding method at a low bit rate, but the aim of standardization is now extended to a more versatile coding process at a high bit rate adaptable to an interlaced image.

FIGS. 8(a)–8(f) are diagrams for explaining an object-by-object (object-based) coding process.

Shown in FIG. 8(a) is an image space Ts obtained from a color signal comprising a luminance signal and a chrominance signal and including an object To corresponding to an image. Shown in FIG. 8(b) is an image space Ss obtained from a shape signal indicating a shape of the object. In the image space Ss shown in FIG. 8(b), a portion painted in black is an inside region of an object So. The fish image (object) To in the image space Ts is represented by a color signal corresponding to pixels composing the inside region (pixels inside the object).

According to MPEG4, an image signal comprising the shape signal and the color signal corresponding to an object is coded for each unit region (macroblock) composed of a predetermined number of pixels. While MPEG1 and MPEG2 have introduced a technique for coding the color signal for each macroblock, MPEG4 adopts a technique for coding the color signal and the shape signal for each macroblock.

FIG. 8(c) schematically shows a blocking process in which the color signal is divided into signals corresponding to respective macroblocks Tmb composing the image space Ts. FIG. 8(d) schematically shows a blocking process in which the shape signal is divided into signals corresponding to respective macroblocks Smb composing the image space Ss.

With a view to performing an efficient coding process for a frame (image space) including an object, according to MPEG4, only the inside of a rectangular region including the object in the frame rather than an image signal corresponding to the entire frame is coded. The rectangular region is called a "bounding box".

To be specific, for the color signal, as shown in FIG. 8(e), the bounding box Tb is divided into portions corresponding to respective macroblocks (blocking process). Also, for the shape signal, as shown in FIG. 8(f), a bounding box Sb is divided into portions corresponding to macroblocks (blocking process).

The image signal comprising the color signal and the shape signal is subjected to a motion compensation coding process for each macroblock like a motion compensation coding process according to MPEG1 and MPEG2.

In this motion compensation coding process, there should be a match of motion change from frame to frame between the color and shape signals. In actuality, however, there is no match between real motion of the object and motion of the object of respective signals which improves coding efficiency.

The motion compensation coding process is to perform coding to a motion compensation error of the color or shape signal. If motion information giving the motion compensation error smaller than that of motion information (motion vector) indicating real motion of the object is obtained in the motion compensation coding process, it is more desirable to perform the motion compensation process based on the motion information giving the smaller error, because this increases coding efficiency. Since the color signal is a multi-valued signal, and the shape signal is a binary signal for distinguishing between pixels inside the object and pixels outside the object, their qualities differ from each other a little, and correspondingly the motion vectors thereof giving smaller errors differ from each other a little.

The motion compensation error is a difference value between a color or shape signal corresponding to a macroblock to-be-processed (target macroblock)i.e., macroblock to be coded, in a current frame (frame being coded) and a color or shape signal corresponding to a region equal to the macroblock to-be-processed in size (prediction macroblock) in a previous (past) frame (coded frame serving as a reference frame). The motion vector of each macroblock is position information indicating the positioning relationship between the macroblock to-be-processed on the frame and the prediction macroblock.

According to MPEG4, the color signal and the shape signal are subjected to the motion compensation coding process based on the motion vectors (hereinafter referred to as a color motion vector and a shape motion vector) obtained from the corresponding color and shape signals, respectively.

Although a match might not be always found between the color motion vector and the corresponding shape motion vector with respect to size or direction, there is high correlation between them. For this reason, in MPEG4, according to the shape motion vector of the coded macroblock in a current frame and the corresponding color motion vector, a prediction value of the shape motion vector of the target macroblock is generated, and a difference value between the prediction value and the value of the shape motion vector of the target macroblock, i.e., information of the shape motion vector of the target macroblock is coded.

A description will be given of a prior art image decoding apparatus according to MPEG4.

FIG. 9 is a block diagram for explaining an MPEG compliant image coding apparatus according to the prior art.

Turning now to FIG. 9, there is shown an image coding apparatus 1000. The image coding apparatus 1000 comprises a color coding section 1100 which subjects the color signal to a coding process including the motion compensation coding process and a shape coding section 1200 which subjects the shape signal to a coding process including the motion compensation coding process.

The shape coding section 1200 includes a blocking unit 1210 which performs a blocking process in such a way that a shape signal Ss corresponding to an object input through an input terminal 1201 is divided into signals corresponding to macroblocks and outputs blocked shape signals Bs, and a memory 1260 which stores a shape signal (locally decoded shape signal) Lds of a coded frame (previous frame) as a reference shape signal MLds.

The shape coding section 1200 further includes a shape motion detector 1240 which detects a motion vector (shape motion vector) MVs of the target macroblock to-be-processed based on the reference shape signal MLds stored in the memory 1260 and the blocked shape signal Bs output from the blocking unit 1210, and outputs a motion compensation error signal Dfs of the shape signal obtained in this detection process, a shape motion compensator 1250 which performs the motion compensation process to the blocked shape signal Bs based on the reference shape signal MLds and the shape motion vector MVs and outputs a prediction shape signal Ps for the target macroblock (shape signal of the prediction macroblock), and a mode decision unit 1280 which performs a coding mode decision process for the shape signal based on the blocked shape signal Bs output from the blocking unit 1210 and the motion compensation error signal Dfs output from the shape motion detector 1240 and outputs a shape coding mode signal Mo.

The shape coding mode signal Mos indicates that the target macroblock corresponding to the shape signal is a macroblock outside the object, an intra-macroblock which has been intra-frame coded using correlation between pixel values in a frame, or an inter-macroblock which has been inter-frame coded using correlation of pixel values between frames. The macroblock outside the object is a macroblock, the pixels of which are all positioned outside the object. The intra-macroblock and the inter-macroblock are macroblocks inside the object, and at least some of their pixels are positioned inside the object.

The shape coding section 1200 still further includes a shape encoder 1220 which performs an arithmetic coding process (inter-frame coding process) with reference to the prediction shape signal Ps or an arithmetic coding process (intra-frame coding process) without reference to the prediction shape signal Ps for the blocked shape signal Bs according to the shape coding mode signal Mos and outputs a coded shape signal Cs, and outputs a decoded signal (locally decoded shape signal) Lds of the coded shape signal Cs, a variable length encoder 1230 which performs a variable length coding process to the coded shape signal Cs and the shape coding mode signal Mos and outputs a coded shape signal Es, and a motion vector coding unit 1270 which performs coding to the shape motion vector MVs according to the coding mode signal Mos and information Mmvt and Mmot relating to the motion vector sent from the color coding apparatus 1100 and outputs a coded motion vector signal Emvs.

In this shape coding apparatus 1200, the locally decoded shape signal Lds from the shape encoder 1220 is stored in the memory 1260 as the reference shape signal MLds, which is output to the shape motion detector 1240 and the shape motion compensator 1250 and used in the motion detection process and the motion compensation process for the shape signal, respectively. The locally decoded shape signal Lds is sent to the color coding section 1100 and used in the motion detection process and the motion compensation process for the color signal.

The color coding section 1100 includes a blocking unit 1100 which performs a blocking process in such a way that a color signal St corresponding to an object input through an input terminal 1101 is divided into signals corresponding to respective macroblocks and outputs blocked color signals Bt and a memory 1160 which stores a color signal (locally decoded color signal) Ldt of a coded frame (previous frame) as a reference color signal MLdt.

The color coding section 1100 further includes a color motion detector 1140 which detects a color motion vector MVt of the target macroblock based on the reference color signal MLdt stored in the memory 1160, the locally decoded shape signal Lds from the shape coding section 1200, and the blocked color signal Bt from the blocking unit 1100, and outputs a motion compensation error signal DFt of the color signal, a mode decision unit 1180 which performs a coding mode decision process for the color signal based on the blocked color signal Bt from the blocking unit 1110, the motion compensation error signal DFt from the color motion detector 1140, and the blocked shape signal BS from the shape coding section 1200 and outputs a color coding mode signal Mot, and a color motion compensator 1150 which performs a motion compensation process to the blocked color signal Bt based on the reference color signal MLdt, the color motion vector MVt, and the locally decoded shape signal Lds from the shape coding section 1200, and outputs a prediction color signal Pt of the target macroblock (color signal of the prediction macroblock).

The color coding mode signal Mot indicates the target macroblock is the macroblock outside the object, the intra-macroblock, or the inter-macroblock.

The color coding section 1100 still further includes a color encoder 1120 which performs a wave coding process with reference to the prediction color signal Pt(inter-frame coding process) or a wave coding process without reference to the prediction color signal Pt (intra-frame coding process) for the blocked color signal Bt and outputs a coded color signal Ct and outputs a decoded signal (locally decoded color signal) Ldt of the coded color signal Ct, a variable length encoder 1130 which performs variable length coding to the coded color signal Ct and the color coding mode signal Mot and outputs a coded color signal Et, a motion vector coding unit 1170 which perform coding to the color motion vector MVt and outputs a coded motion vector signal Emvt and outputs the information Mmvt and Mmot relating to the color motion vector to the motion vector coding unit 1270.

In this color coding section 1100, the locally decoded color signal Lds from the color encoder 1120 is stored in the memory 1160 as the reference color signal MLds, which is output to the color motion detector 1140 and the color motion compensator 1150 and used in motion detection and motion compensation processes for the color signal, respectively.

It should be remembered that the image signal according to MPEG includes a transparency signal indicating the composition ratio in which the color signal corresponding to the object and another color signal are composited, and the image coding apparatus includes a transparency coding section for coding the transparency signal in addition to the shape coding section 1200 and the color coding section 1100, although this is not illustrated herein. The construction of the transparency coding section is almost identical to that of the color coding section 1100 and differs from the same in that the transparency signal is subjected to a motion compensation process according to the color motion vector MVt. That is, the transparency coding section includes no motion detector.

Subsequently, a description will be given of operation of such a constructed image coding apparatus 1000.

When the shape signal Ss of the image signal corresponding to a given object is input to the input terminal 1201 of the shape coding section 1200, the blocking unit 1210 divides the shape signal Ss into signals corresponding to respective macroblocks into which the rectangular region (bounding box) is divided, to generate blocked shape signals Ss. The blocked shape signal Bs is supplied to the shape motion detector 1240, the shape encoder 1220, and the mode decision unit 1280 in the shape coding unit 1200, the mode decision unit 1180 in the color coding unit 1100.

The shape motion detector 1240 detects the shape motion vector MVs of the target macroblock based on the blocked shape signal Bs and the reference shape signal MLds of the previous frame stored in the memory 1260. The shape motion vector MVs is output to the shape motion compensator 1250 and the motion vector coding unit 1270.

At this time, the shape motion detector 1240 also outputs the motion compensation error signal DFs of the shape signal which has been generated in the motion detection process to the mode decision unit 1280. The mode decision unit 1280 performs the coding mode decision process for the target macroblock based on the blocked image signal Bs and the motion compensation error signal DFs and outputs the shape coding mode signal Mos.

The shape motion compensator 1250 performs motion compensation to the blocked shape signal Bs based on the shape motion vector MVs and the reference shape signal MLds, to generate the prediction shape signal Ps for the target macroblock. The shape motion vector coding unit 1270 performs coding to the shape motion vector MVs according to the shape coding mode signal Mos and the information Mmvt and Mmot relating to the motion vectors from the motion vector coding unit 1170, and outputs the coded shape motion vector signal Emvs through the output terminal 1203.

The shape encoder 1220 performs arithmetic coding to the blocked shape signal Bs with or without reference to the prediction shape signal Ps according to the shape coding mode signal Mos, to generate the coded shape signal Cs and performs arithmetic decoding to the coded shape signal Cs to generate the locally decoded shape signal Lds, which is stored in the memory 1260 as the reference shape signal MLds.

The variable length encoder 1230 transforms the coded shape signal Cs and the shape coding mode signal Mos into variable length codes and outputs the resulting coded shape signal Es through the output terminal 1202.

When the color signal St of the image signal corresponding to the given object is input to the input terminal 1101 of the color coding section 1100, the blocking unit 1110 divides the color signal St into signals corresponding to respective macroblocks into which the rectangular region (bounding box) is divided, to generate blocked color signals St. The blocked color signal Bt is supplied to the color motion detector 1140, the color encoder 1120, and the mode decision unit 1180.

The color motion detector 1140 detects the color motion vector MVt of the target macroblock based on the blocked color signal Bt, the reference color signal MLdt stored in the memory 1160, and the locally decoded shape signal Lds from the shape coding section 1200. The color motion vector MVt is output to the color motion compensator 1150 and the motion vector coding unit 1170.

At this time, the color motion detector 1140 also outputs the motion compensation error signal DFt of the color signal generated in the motion detection process to the mode decision unit 1180. The motion decision unit 1180 performs the coding mode decision process for the target macroblock based on the blocked image signal Bt, the motion compensation error signal DFt, and the blocked shape signal Bs, and outputs the color coding mode signal Mot.

The color motion compensator 1150 performs motion compensation for the blocked color signal Bt based on the color motion vector MVt, the reference color signal MLdt, and the locally decoded shape signal Lds, to generate the prediction color signal Pt for the target macroblock. The color motion vector coding unit 1170 performs coding to the color motion vector MVt according to the color coding mode signal Mot. Thereby, the coded motion vector signal Emvt is output through the output terminal 1103 and the information Mmvt and Mmot relating to the color motion vector MVt is supplied to the motion vector coding unit 1270 in the shape coding unit 1200 from the color motion vector coding unit 1170.

The color encoder 1120 performs wave coding to the blocked color signal Bt with or without reference to the prediction color signal Pt based on the color coding mode signal Mot and the locally decoded shape signal Lds, to generate the coded color signal Ct and performs wave decoding to the coded color signal Ct to generate the locally decoded shape signal Ldt, which is stored in the memory 1160 as the reference color signal MLdt.

The variable length encoder 1130 transforms the coded color signal ct and the color coding mode signal Mot into variable length codes and outputs the coded color signal Et through the output terminal 1102.

A description will be given of an MPEG4 compliant image decoding apparatus.

Turning to FIG. 10, there is shown an image decoding apparatus 2000. The image decoding apparatus 2000 is adapted to perform a decoding process for the coded image signal sent from the image coding apparatus 1000 shown in FIG. 9, and comprises a color decoding section 2100 which performs a decoding process including a motion compensation decoding process for the coded color signal Et sent from the color coding section 1100 and a shape decoding section 2200 which performs a decoding process including the motion compensation decoding process for the coded shape signal Es sent from the shape coding section 1200.

The shape decoding section 2200 includes a variable length decoder 2210 which performs variable length decoding to the coded shape signal Es corresponding to an object input through an input terminal 2201 and outputs a decoded shape signal As and the shape coding mode signal Mos and a shape decoder 2220 which performs arithmetic decoding to the decoded shape signal As corresponding to the target macroblock with or without reference to a prediction shape signal Ps according to the coding mode signal Mos and outputs a decoded shape signal Ds.

The shape decoding section 2200 further includes a memory 2260 which stores the decoded shape signal Ds as a reference shape signal MDs of a decoded frame (previous frame), and an inverse blocking unit 2230 which integrates the decoded shape signals Ds in such a way that they correspond to respective macroblocks composing the bounding box and outputs the resulting regenerated shape signal Rs through an output terminal 2203.

The shape decoding section 2200 still further includes a motion vector decoding unit 2240 which decodes the coded shape motion vector signal Emvs sent from the image coding apparatus 1000 according to the shape coding mode signal Mos and the color motion vector information Mmvs and Mmot from the color decoding section 2100, to provide a decoded shape motion vector signal Dms, and a shape motion compensator 2250 which generates the prediction shape signal Ps for the target macroblock based on the decoded shape motion vector signal Dmvs and the reference shape signal MDs.

The color decoding section 2100 includes a variable length decoder 2110 which performs variable length decoding to the coded color signal Et corresponding to an object supplied through an input terminal 2101 and outputs a decoded color signal At and the color coding mode signal Mot, and a color decoder 2120 which performs wave coding to the decoded color signal At with or without reference to the prediction color signal Pt and outputs a decoded color signal Dt.

The color decoding section 2100 further includes a memory 2160 which stores the decoded color signal Dt as a reference color signal MDt of a decoded frame (previous frame), an inverse blocking unit 2130 which integrates the decoded color signals Dt in such a way that they correspond to respective macroblocks composing the bounding box and outputs the resulting regenerated color signal Rt through an output terminal 2103, a motion vector decoding unit 2140 which decodes the coded color motion vector signal Emvt sent from the image coding apparatus 1000 according to the color coding mode signal Mot, to provide a decoded color motion vector signal Dmvt, and outputs the information Mmvt and Mmot of the color motion vector, and a color motion compensator 2150 which generates a prediction color signal Pt for the target macroblock based on the decoded color motion vector signal Dmvt, the reference color signal MDt, and the decoded shape signal Ds from the shape decoding section 2200.

Subsequently, a description will be given of operation of such a constructed image decoding apparatus 2000.

When the coded shape signal Es corresponding to the object is input through the input terminal 2201, the variable length decoder 2210 performs variable length decoding to the coded shape signal Es in macroblock units to generate the decoded shape signal As and the shape coding mode signal Mos for each macroblock.

The coded shape motion vector signal Emvs is supplied to the motion vector decoding unit 2240 through the input terminal 2202, which decodes the signal Emvs according to the shape coding mode signal Mos and the information Mmvs and Mmot from the color decoding section 2100 to provide the decoded shape motion vector signal Dmvs. The shape motion compensator 2250 generates the prediction shape signal Ps for the target macroblock based on the decoded shape motion vector signal Dmvs and the reference shape signal MDs stored in the memory 2260.

The shape decoder 2220 performs arithmetic decoding to the decoded shape signal As for the target macroblock with or without reference to the prediction shape signal Ps to generate the decoded shape signal Ds, which is stored in the memory 2260 as the reference shape signal MDs, and output to the inverse blocking unit 2230, which integrates the decoded shape signals Ds in such a way that they correspond to respective macroblocks composing the bounding box and outputs the resulting regenerated shape signal Rs through the output terminal 2203.

When the coded color signal Et corresponding to the object is input through the input terminal 2101, the variable length decoder 2110 performs variable length decoding to the coded color signal Et in macroblock units, to generate the decoded color signal At and the color coding mode signal Mot for each macroblock.

The coded color motion vector signal Emvt is input to the motion vector decoding unit 2140 through the input terminal 2102, which decodes the signal Emvt according to the color coding mode signal Mot and outputs the decoded color motion vector signal Dmvt and the information Mmvt and Mmot relating to the color motion vector. The color motion compensator 2150 generates the prediction color signal Pt for the target macroblock based on the decoded color motion vector signal Dmvt, the reference shape signal MDt stored in the memory 2160, and the decoded shape signal Ds from the shape decoder 2220.

The color decoder 2120 performs wave decoding to the decoded color signal At corresponding to the target macroblock with or without reference to the prediction color signal Pt based on the color coding mode signal Mot and the decoded shape signal Ds from the shape decoding section 2000 to generate the decoded color signal Dt, which is stored in the memory 2160 as the reference color signal MDt and output to the inverse blocking unit 2130. The inverse blocking unit 2130 integrates the decoded color signals Dt in such a way that they correspond to respective macroblocks composing the bounding box and outputs the resulting regenerated color signal Rt through the output terminal 2103.

Hereinafter, a description will be given of a coding process for the color motion vector and the shape motion vector performed by the image coding apparatus 1000.

Initially, a description will be given of the motion compensation process by the use of the motion vector.

According to MPEG4, in a frame-by-frame motion compensation process for the color signal (interlaced or non-interlaced color signal) forming one macroblock (image space composed of (16×16) pixels, as shown in FIG. 11(a), four motion vectors MV1–MV4 are used to generate a prediction color signal for a target macroblock to-be-processed MB. The motion vectors MV1–MV4 correspond to four blocks (image spaces each composed of (8×8) pixels B1–B4 composing the macroblock MB, respectively. When these motion vectors MV1–MV4 are equivalent, the frame-by-frame motion compensation process for the macroblock MB is, as shown in FIG. 11(d), equivalent to the motion compensation process by the use of one motion vector MV (MV=MV1=MV2=MV3=MV4).

Meanwhile, in a field-by-field motion compensation process for the color signal (interlaced color signal) corresponding to one macroblock, as shown in FIG. 11(b), first and second motion vectors MVf1 and MVf2 are used to generate the prediction color signal for the target macroblock MB in a frame to-be-processed. The first motion vector MVf1 is a motion vector of a first sub-macroblock MBf1 comprising pixels on scanning lines in an odd field in the frame, and the second motion vector MVf2 is a motion vector of a second sub-macroblock MVf2 comprising pixels on scanning lines in an even field in the frame. Each of the sub-macroblocks is an image space comprising (16×8) pixels, although they are shown as square regions for convenience in the illustrated example shown in FIG. 11(b). When the first and second motion vectors MVf1 and MVf2 are equivalent, the field-by-field motion compensation process for the macroblock MB is, as shown in FIG. 11(d), equivalent to the frame-by-frame motion compensation process by the use of one motion vector MV (MV=MV1=MV2=MV3=MV4).

On the other hand, a frame-by-frame motion compensation process for the shape signal is different from the frame-by-frame motion compensation process for the color signal. As shown in FIG. 11(d), only the motion vector MV is used to generate the prediction shape signal for the target macroblock MB.

Subsequently, a description will be given of a process for coding motion vectors.

In the process for coding the motion vector (color motion vector) of the color signal corresponding to the target macroblock (16×16 pixels), difference (difference value) between a prediction motion vector predicted from a motion vector of a reference macroblock which has been coded and is positioned adjacently to the target macroblock and a motion vector of the target macroblock is coded as motion vector information of the target macroblock.

Hereinafter, a description will be given of the process for predicting the color motion vector with reference to FIGS. 12(a)–12(d).

(1) Motion Vector Prediction Process in Frame-by-Frame Motion Compensation Process (1a) When a target macroblock MBx has four motion vectors, as shown in FIG. 12(a), the prediction value of a motion vector MVt0a of a block B0a in the target macroblock MBx is generated based on motion vectors MVt1a, MVt2a, and MVt2b of reference blocks RB1a, RB2a, and RB2b which are adjacent to the block B0a.

The prediction value of a motion vector MVt0b of a block B0b in the target macroblock MBx is, like the prediction value of the motion vector MVt0a, motion vectors MVt0a, MVt2b, and MVt3 of reference blocks B0a, RB2b, and RB3 which are adjacent to the block B0b. The prediction value of a motion vector MVt0c of a block B0c in the target macroblock MBx is, like the prediction value of the motion vector MVt0a, generated based on motion vectors MVt1b, MVt0a, and MVt0b of reference blocks RB1b, B0a, and B0b which are adjacent to the block B0c.

The prediction value of a motion vector MVt0d of a block B0d in the target macroblock MBx is generated based on motion vectors MVt0c, MVt0a, and MVt0b of reference blocks B0c, B0a, and B0b which are adjacent to the block B0d.

(1b) When a target macroblock MB0 has one motion vector MVt0, that is, when motion vectors MVt0a–MVt0d of respective blocks B0a–B0d in the target macroblock MBx are equivalent, as shown in FIG. 12(b), the prediction value of the motion vector MVt0 of the target macroblock MB0 is generated based on motion vectors MVt1, MVt2, and MVt3 of reference blocks RB1, RB2, and RB3 which are adjacent to the target macroblock.

In the above description of the motion vector prediction process in the frame-by-frame motion compensation process, the reference macroblock adjacent to the target macroblock in the macroblock which has been subjected to the frame-by-frame motion compensation process and has four motion vectors. In a case where the reference macroblock has one motion vector, based on the assumption that four blocks composing the reference macroblock have the same motion vector, the prediction values of respective blocks composing the macroblock are generated. In another case where the reference macroblock is a macroblock which has been subjected to the field-by-field motion compensation process and has two motion vectors, based on the average of these motion vectors, the prediction values of respective blocks are generated.

(2) Motion Vector Prediction Process in Field-By-Field Motion compensation Process The field-by-field motion compensation process is, as shown in FIG. 12(c), for the case where a target macroblock MBy to-be-processed has first and second motion vectors MVt01 and MVt02. The first motion vector MVt01 is the motion vector of the sub-macroblock MBf1 comprising (16×8) pixels on scanning lines in the odd field in the frame, and the second motion vector MVt02 comprising (16×8) pixels is the motion vector of the sub-macroblock comprising pixels on scanning lines in the even field in the frame. In this case, the prediction values of the first and second motion vectors MVt01 and MVt02 of the target macroblock MBy are generated based on the motion vectors MVt1, MVt2, and MVt3 of the reference blocks RB1, RB2, and RB3 adjacent to the target macroblock MBy.

In the above description of the motion vector prediction process in the field-by-field motion compensation process, the reference macroblock adjacent to the target macroblock is the macroblock which has been subjected to the frame-by-frame motion compensation process and has four motion vectors. In a case where the reference macroblock has one motion vector, based on the assumption that four blocks composing the reference macroblock have the same motion vector, the prediction values of motion vectors MVt01 and MVt02 of the two sub-macroblocks MBf1 and MBf2 composing the target macroblock MBy are generated.

In another case where the reference macroblock is a macroblock which has been subjected to the field-by-field motion compensation process and has two motion vectors, the prediction value of the motion vector MVt01 of the sub-macroblock MBf1 corresponding to the odd field is generated based on the motion vector of the sub-macroblock corresponding to the odd field in the reference macroblock, and the prediction value of the motion vector MVt02 of the sub-macroblock MBf2 corresponding to the even field is generated based on the motion vector of the sub-macroblock corresponding to the even field in the reference macroblock.

Hereinafter, a description will be given of the shape motion vector prediction process in the shape signal motion compensation process. As described above, the target macroblock corresponding to the shape signal has always one motion vector.

In the motion vector (shape motion vector) coding process for the target macroblock (16×16 pixels), a difference value between the value of the prediction motion vector and the value of the shape motion vector of the target macroblock, i.e., the shape motion vector information of the target macroblock, is coded.

As already described, since there is high correlation between the motion vector of the shape signal and the motion vector of the color signal, the prediction value (prediction shape motion vector) of the shape motion vector of the target macroblock is generated based on both of the color motion vector of the coded reference macroblock and the shape motion vector of the coded reference macroblock.

The prediction value of the shape motion vector MVS0 of the target macroblock MBs0 shown in FIG. 12(d) is generated by referring to the color motion vectors MVt1, MVt2, and MVt3 of the blocks RB1, RB2, and RB3 adjacent to the target macroblock MB0 corresponding to the color signal shown in FIG. 12(b) as well as the vectors MVs1, MVs2, and MVs3 of the macroblocks RMBs1, RMBs2, and RMBs3 adjacent to the target macroblock MBs0 shown in FIG. 12(d).

In the process for predicting the color motion vector and the shape motion vector, if macroblocks adjacent to the target macroblock are intra-macroblocks or macroblocks outside the object, they have no motion vectors, in which case, the prediction value of the motion vector of the target macroblock is generated using adjacent macroblocks which have motion vectors as reference macroblocks.

FIG. 13 is a block diagram for explaining a prior art motion vector coding unit included in the image coding apparatus 1000. Shown in FIG. 13 is the motion vector coding unit (color motion vector coding unit) 1170 included in the color coding section 1100 and the motion vector coding unit (shape motion vector coding unit) 1270 included in the shape coding section 1200. By way of example, a description will be given of a case where the target macroblock MB0 has one color motion vector and the blocks RB1–RB3 adjacent to the target macroblock MB0 are used as reference blocks (see FIG. 12(b)).

The color motion vector coding unit 1170 is adapted to perform coding to the motion vector of the non-interlaced color signal, and includes an MV memory 102 which stores the motion vector MVt of the target macroblock input through an input terminal 1 and an MV memory 103 which stores the color coding mode signal Mot input through an input terminal 2. The color coding mode signal Mot is the color motion vector effectiveness signal indicating that the target macroblock in the image space obtained from the color signal is one of the intra-macroblock and the macroblock outside the object or the inter-macroblock. According to this signal Mot, it is decided whether the reference macroblock adjacent to the target macroblock is one of the intra-macroblock and the macroblock outside the object, or the inter macroblock.

The color motion vector coding unit 1170 further includes an MV predictor 104 which generates an MV prediction value (the prediction value of the color motion vector of the target macroblock) Pmvt from the color motion vectors MVt1, MVt2, and MVt3 of the reference blocks RB1, RB2, and RB3 in the coded macroblock which have been stored in the MV memory 102 according to the color coding mode signal Mmot (Mot) from the MV memory 103, and an MV encoder 105 which encodes the color motion vector MVt0 of the target macroblock MB0 with reference to the MV prediction value Pmvt from the MV predictor 104 and outputs the coded color motion vector signal Emvt.

The color motion vector coding unit 1170 still further includes a primary switch 100 provided between the input terminal 1 and the MV encoder 105, and a secondary switch 101 provided between an output terminal 10 and the MV encoder 105, the switches 100 and 101 being on-off controlled by the color coding mode signal Mot.

The shape motion vector coding unit 1270 is adapted to perform coding to the motion vector of the non-interlaced shape signal and includes an MV memory 202 which stores the shape motion vector MVs of the target macroblock input through an input terminal 4, and an MV memory 203 which stores the shape coding mode signal Mos input through an input terminal 5. The shape coding mode signal Mos is the shape motion vector effectiveness signal indicating that the target macroblock in the image space obtained from the shape signal is one of the intra-macroblock and the macroblock outside the object or the inter-macroblock. According to this signal Mos, it is decided whether each of the reference macroblock adjacent to the target macroblock is one of the intra-macroblock and the macroblock outside the object, or the inter macroblock.

The shape motion vector coding unit 1270 further includes an MV predictor 204 which generates an MV prediction value (the prediction value of the shape motion vector for the target macroblock) Pmvs from the shape motion vectors MVs1, MVs2, and MVs3 in the coded macroblock which have been stored in the MV memory 202 according to the color coding mode signal Mot and the shape coding mode signal Mos, and an MV encoder 205 which encodes the shape motion vector MVS0 of the target macroblock MBs0 with reference to the MV prediction value Pmvs from the MV predictor 204 and outputs the coded shape motion vector signal Emvs. The MV predictor 204 is adapted to convert a 0.5 pixel-precision color motion vector from the MV memory 102 into a one pixel-precision color motion vector and perform the prediction process by the use of the one-pixel precision color motion vector. This is because the color coding section performs the motion compensation process by the use of the 0.5 pixel-precision while the shape coding section performs the motion compensation process by the use of the one-pixel precision.

The shape motion vector coding unit 1270 still further includes a primary switch 200 provided between an input terminal 4 and the MV encoder 205, and a secondary switch 201 provided between an output terminal 11 and the MV encoder 205, the switches 200 and 201 being on-off controlled by the shape coding mode signal Mos.

Subsequently, operation will be described.

The color motion vector coding unit 1170 performs coding to the color motion vector MVt and outputs the coded signal Emvt, and the shape motion vector coding unit 1270 performs coding to the shape motion vector MVs and outputs the coded signal Emvs.

When the color coding mode signal Mot is input to the input terminal 2 as the motion vector effectiveness signal, in accordance with this signal Mot, the switches 100 and 101 are on-off controlled. To be specific, when the color motion vector MVt0 of the target macroblock MB0 should be coded, the switches 100 and 101 are in the ON-state, or otherwise, they are in the OFF-state.

In other words, when the target macroblock is the intra-macroblock or the macroblock outside the object, and therefore the coding process for the motion vector is unnecessary, the switches 100 and 101 are in the OFF-state. On the other hand, when the target macroblock is the inter-macroblock, the switches 101 and 101 are in the ON-state.

The color motion vector MVt for each macroblock is temporarily stored in the MV memory 102. To be more detailed, the color motion vectors (see FIG. 11(a)) of the blocks composing each macroblock are stored in the MV memory 102, from which the motion vectors MVt1–MVt3 of the reference blocks MB1–MB3 adjacent to the target macroblock MB0 are supplied to the MV predictor 104. At this time, the signal Mot is temporarily stored in the MV memory 103.

The color motion vector effectiveness signal Hot for the target macroblock is also input to the MV predictor 104, which decides that each of the motion vectors MVt1–MVt3 should be coded according to the signal Mot, that is, each of the reference blocks RB1–RB3 is one of the intra-macroblock and the macroblock outside the object, or the inter-macroblock. According to the decision results, the prediction value (MV prediction value) Pmvt of the motion vector of the target macroblock MB0 is generated.

When decided that the reference blocks RB1–RB3 are the inter-macroblocks, the MV predictor 104 generates the prediction value of the motion vector of the target macroblock MB0 from the motion vectors Mvt1–Mvt3 of the coded reference blocks RB1–RB3 and outputs the prediction value Pmvt to the MV encoder 105. Note that the motion vectors of the reference blocks corresponding to the intra-macroblocks or the macroblocks outside the macroblock are not used for generating the prediction value.

The MV encoder 105 encodes the difference value (color difference motion vector) between the value of the motion vector MVt (MVt0) of the target macroblock and the prediction value Pmvt as the value of the color motion vector to generate the coded signal Emvt of the color motion vector, which is output through the secondary switch 101.

Likewise, when the shape coding mode signal Mos is input to an input terminal 5 as the shape motion vector effectiveness signal Mos, in accordance with this signal Mos, the switches 200 and 201 are on-off controlled. To be specific, when the color motion vector MVs0 of the target macroblock MBs0 is to be coded, the switches 200 and 201 are in the ON-state, or otherwise, they are in the OFF-state.

In other words, when the target macroblock is the intra-macroblock or the macroblock outside the object, and therefore the coding process for the corresponding motion vector is unnecessary, the switches 200 and 201 are in the OFF-state. On the other hand, when the target macroblock is the inter-macroblock, the switches 201 and 201 are in the ON-state.

The shape motion vector MVs for each macroblock is temporarily stored in the MV memory 202. To be more detailed, the motion vectors MVs1–MVs3 of the reference macroblock RMBs1–RMBs3 adjacent to the target macroblock MB0 are sent to the MV predictor 204 from the MV memory 102. The motion vectors MBt1–MBt3 of the blocks MBt1–MBt3 adjacent to the target macroblock MB0 shown in FIG. 12(c) are also sent to the MV predictor 204 from the MV memory 102. The signal Mmos is stored in the AV memory 203.

The MV predictor 204 is supplied with the shape motion vector signal Mmos of the target macroblock from the MV memory 203 and the color motion vector effectiveness signal Mmot (Mot) of the target macroblock from the MV memory 103. The MV predictor 204 decides whether or not the motion vectors MVs1–MVs3 of the reference macroblocks RMBs1–RMBs3 adjacent to the target macroblock should be coded, that is, decides whether or not each of the reference macroblocks is one of the intra-macroblock and the macroblock outside the object, or the inter-macroblock, according to the signal Mos. The MV predictor 204 decides whether or not the motion vectors MVt1–MVt3 of the reference macroblocks RB1–RB3 adjacent to the target macroblock should be coded, that is, decides whether or not each of the reference macroblocks RB1–RB3 is one of the intra-macroblock and the macroblock outside the object, or the inter-macroblock, according to the signal Mmot. According to the decision results, the prediction value (MV prediction value) Pmvs of the motion vector of the target macroblock MBs0 is generated.

When the reference macroblocks RMB1–RMB3 and the reference blocks RB1–RB3 are the inter-macroblocks, the MV predictor 204 generates the prediction value (MV prediction value) Pmvs of the motion vector of the target macroblock MBs0 from the motion vectors MVs1–MVs3 and the motion vectors MVt1–MVt3, and outputs the prediction value Pmvs to the MV encoder 205. Note that motion vectors of the reference blocks corresponding to the intra-macroblocks or the macroblocks outside the object are not used for generating the prediction value.

The MV encoder 205 encodes the difference value (shape difference motion vector) between the value of the motion vector MVs of the target macroblock and the prediction value Pmvs as the value of the shape motion vector to generate the coded signal Emvs of the shape motion vector, which is output through the secondary switch 201.

FIG. 14 is a block diagram for explaining a prior art motion vector decoding unit included in the image decoding apparatus 2000. In FIG. 14, there is shown a motion vector decoding unit (color motion vector decoding unit) included in the color decoding section 2100 and a motion vector decoding unit (shape motion vector decoding unit) 2240 included in the shape decoding section 2200. Also in the description of the motion vector decoding unit, as in the case of the motion vector decoding unit, a description will be given of a case where the target macroblock MB0 has one color motion vector and the blocks RB1–RB3 of the target macroblock are used as reference blocks RB1–RB3 (see FIG. 12(b)).

The color motion vector decoding unit 2140 is adapted to decode the coded color motion vector Em output from the color motion vector coding unit 1170.

The color motion vector decoding unit 2140 includes an MV decoder 303 which decodes the coded color motion vector signal Emvt of the target macroblock to generate a decoded color motion vector signal Dmvt, and an MV memory 304 which temporarily stores the decoded color motion vector signal Dmvt. When the motion vector of the target macroblock MB0 is decoded, the motion vectors MVt1–MVt3 of the reference blocks RB1–RB3 (see FIG. 12(c)) are output from the MV memory 304.

The color motion vector decoding unit 2140 further includes an MV memory 302 which temporarily stores the color coding mode signal Mot for each macroblock input through an input terminal 6, and an MV predictor 305 which generates the MV prediction value Pmvt of the motion vector of the target macroblock from the motion vectors MVt1–MVt3 of the coded reference blocks RB1–RB3.

The color motion vector decoding unit 2140 still further includes a primary switch 300 provided between an input terminal 13 and an MV decoder 303, and a secondary switch 301 provided between an output terminal 20 and an MV decoder 303, the switches 300 and 301 being on-off controlled by the coding mode signal Mot.

The shape motion vector decoding unit 2240 is adapted to decode the coded shape motion vector Emvs output from the motion vector coding unit 1270 shown in FIG. 13.

The shape motion vector decoding unit 2240 includes an MV decoder 403 which decodes the coded shape motion vector signal Emvs of the target macroblock input to an input terminal 14 to generate a decoded shape motion vector signal Dmvs, and an MV memory 404 which temporarily stores the decoded shape motion vector signal Dmvs and outputs motion vectors MVs1–MVs3 of the reference macroblocks RMB1–RMB3 (see FIG. 12(d)).

The shape motion vector decoding unit 2240 further includes an MV memory 402 which stores the coding mode signal Mos of the target macroblock which is input through an input terminal 7, and an MV predictor 405 which generates the MV prediction value Pmvs of the motion vector MVs0 of the target macroblock MBs0 from the motion vectors MVs1–MVs3 of the reference macroblocks RMB1–RMB3 and the motion vectors MVt1–MVt3 of the reference blocks RB1–RB3 according to the coding mode signal Mmos and the coding mode signal Mot.

The shape motion vector decoding unit 2240 still further includes a primary switch provided between an input terminal 14 and an MV decoder 403 and a switch 401 provided between an output terminal 21 and an MV decoder 403, the switches 400 and 401 being on-off controlled by the coding mode signal MOS.

Subsequently, operation will be described.

The color motion vector decoding unit 2140 decodes the coded color motion vector signal Emvt sent from the color motion vector coding unit 1170 to generate the decoded color motion vector signal Dmvt. The shape motion vector decoding unit 2240 decodes the coded shape motion vector signal Emvs sent from the shape motion vector coding unit 1270 to generate the decoded shape motion vector signal Dmvs.

When the coding mode signal Mot decoded by the variable length decoder 2110 included in the color decoding section 2100 is input through the input terminal 6 as the motion vector effectiveness signal indicating whether or not the motion vector of the target macroblock is effective, the primary switch 300 and the secondary switch 301 is on-off controlled by the coding mode signal Mot. To be specific, when the coded color motion vector signal of the target macroblock is to be decoded, the switches 300 and 301 are in the ON-state, or otherwise the switches 300 and 301 are in the OFF-state.

In other words, when the target macroblock is the macroblock which has been intra-frame coded or the macroblock outside the object, and therefore the coding process for its motion vector is unnecessary, the switches are in the OFF-state, while the target macroblock is the macroblock which has been subjected to the motion compensation coding process (inter-frame coding process), the switches are in the ON-state.

The MV decoder 303 decodes the coded color motion vector signal Emvt with reference to the prediction value Pmvt of the color motion vector to generate the decoded color motion vector Dmvt, which is temporarily stored in the Mv memory 304.

When the color motion vector MVt0 of the target macroblock MB0 is decoded, the decoded signals Dmv of the motion vectors MVt1, MVt2, and MVt3 of the reference blocks RB1–RB3 shown in FIG. 12(c) are input to the MV predictor 305.

The coding mode signal Mot is temporarily stored in the MV memory 302. The MV predictor 305 decides whether or not each of the motion vectors MVt1–MVt3 has been coded according to the coding mode signal Mmot from the MV memory 302, that is, each of the reference blocks is either one of the intra-macroblock and the macroblock outside the object or the inter-macroblock. According to the decision results, the prediction value (MV prediction value) Pmvt of the motion vector MVt0 of the target macroblock MB0 is generated. The prediction value is generated as in the process performed by the color motion vector coding unit, and the resulting MV prediction value Pmvt is output to the MV decoder 303.

When the coding mode signal Mos decoded by the variable length decoder 2210 included in the shape decoding section 2200 is input through the input terminal 7, the switches 400 and 401 are on-off controlled. To be specific, when the coded shape motion vector signal of the target macroblock should be decoded, the switches 400 and 401 are in the ON-state, or otherwise the switches 400 and 401 are in the OFF-state.

In other words, when the target macroblock is the macroblock which has been intra-frame coded or the macroblock outside the object, and therefore the coding process for its motion vector is unnecessary, the switches 400 and 401 are in the OFF-state, while the target macroblock is the macroblock which has been subjected to the motion compensation coding process (inter-frame coding process), the switches are in the ON-state.

The MV decoder 403 decodes the coded shape motion vector signal Emvs with reference to the prediction value Pmvs to generate the decoded shape motion vector signal Dmvs, which is temporarily stored in the MV memory 404.

When the shape motion vector MVs0 of the target macroblock MBs0 is coded, the decoded signals Dmvs of the motion vectors MVs1, MVs2, and MVs3 of the reference macroblocks RMB1, RMB2, and RMB3 shown in FIG. 12(d) and the decoded signals Dmvt of the motion vectors MVt1, MVt2, and MVt3 of the reference blocks RB1, RB2, and RB3 shown in FIG. 12(c) are input to the MV predictor 405.

The coding mode signal Mos is temporarily stored in the MV memory 402. The MV predictor 405 is supplied with the signal Mos from the MV memory 402 and the signal Mmot from the MV memory 302.

The MV predictor 405 decides whether or not each of the shape motion vectors MVs1–MVs3 of the reference macroblocks, that is, decides whether or not each of them is one of the intra-macroblock and the macroblock outside the object, or the inter-macroblock, according to the signal Mmos. Also, the MV predictor 405 decides whether or not each of the motion vectors MVt1–MVt3 of the reference blocks, that is, decides whether or not each of the reference blocks is one of the intra-macroblock and the macroblock outside the object, or the inter-macroblock, according to the coding mode signal Mmot. According to the decision results, the prediction value Pmvs of the target macroblock Mbs0 is generated. The prediction value is generated as in the process performed by the color motion vector coding unit. The resulting MV prediction value Pmvs is output to the MV decoder 403.

In the image coding process according to MPEG4, an image signal to be processed can be extended to an interlaced image signal, like MPEG2. In this image coding process, field-by-field motion compensation can be performed to a color signal.

The field-by-field motion compensation according to MPEG4 is identical to that according to MPEG2. In the motion compensation process, as shown in FIG. 12(c), motion vectors MVt01 and MVt02 corresponding to blocks MBf1 and MBf2 in the first and second fields composing a macroblock are assigned to each macroblock in one image (one frame). That is, two motion vectors exist for each macroblock.

The motion compensation process according to MPEG4 employs a vector coding method in which a difference motion vector between the motion vector of a target macroblock and a motion vector predicted from the motion vector of a macroblock adjacent to the target macroblock is encoded as information of the motion vector of the target macroblock, thereby providing higher coding efficiency than that of the motion vector coding based on MPEG2.

FIG. 15 is a block diagram illustrating a prior art motion vector coding unit for an interlaced color signal.

The motion vector coding unit 1170a includes a frame MV memory 102a which stores motion vectors used for the frame-by-frame motion compensation (hereinafter referred to as frame-basis motion vectors); a field MV memory 102b which stores motion vectors used for the field-by-field motion compensation (hereinafter referred to as field-basis motion vectors); a field MV converter 110a which converts a frame-basis motion vector to field-basis motion vectors; and a frame MV converter 110b which converts field-basis motion vectors to a frame-basis motion vector.

Further, the motion vector coding unit 1170a includes an MV memory 103 which stores a coding mode signal Mot indicating whether the motion vector of a target macroblock is effective or not; a frame MV predictor 104a which generates a prediction value of the frame-basis motion vector from the frame-basis motion vector of a reference macroblock which has already been coded, according to the stored coding mode signal Mmot; and a field MV predictor 104b which generates a prediction value of the field-basis motion vector from the field-basis motion vector of a reference macroblock which has already been coded, according to the stored coding mode signal Mmot.

The frame MV predictor 104a refers to the motion vector stored in the frame MV memory 102a when the motion vector of the already coded reference macroblock is a frame-basis motion vector, and refers to a frame-basis motion vector which has been obtained by converting the field-basis motion vectors stored in the field MV memory 102b by the frame MV converter 110b when the motion vector of the reference macroblock is a field-basis motion vector. The field MV predictor 104b refers to the motion vector stored in the field MV memory 102b when the motion vector of the already coded reference macroblock is a field-basis motion vector, and refers to field-basis motion vectors obtained by converting the frame-basis motion vector stored in the frame MV memory 102a by the field MV converter 110a when the motion vector of the already coded reference block is a frame-basis motion vector.

Moreover, the motion vector coding unit 1170a includes a frame MV encoder 105a which encodes the frame-basis motion vector by referring to the MV prediction value output from the MV predictor 104a; and a field MV encoder 105b which encodes the field-basis motion vector by referring to the MV prediction value output from the MV predictor 104b.

Further, the motion vector coding unit 1170a includes a primary switch 100 having an input node S1i connected to the input terminal 1, a first output node S1a connected to the inputs of the frame MV memory 102a and the frame MV encoder 105a, a second output node S1b connected to the inputs of the field MV memory 102b and the field MV encoder 105b, and a third output node S1c which is open. The primary switch 100 connects the input node S1i to any of the first to third output nodes, according to the color coding mode signal Mot. The motion vector coding unit 1170a further includes a secondary switch 101 having an output node s2o connected to the output terminal 10, a first input node S2a connected to the output of the field MV encoder 105a, a second input node S2b connected to the output of the field MV encoder 105b, and a third input node S2c which is open. The secondary switch 101 connects the output node S2o to any of the first to third input nodes, according to the color coding mode signal Mot.

A description is given of the operation.

The color motion vector Mvt of the target macroblock is input to the input terminal 1, while the color motion vector effectiveness signal Mot of the target macroblock is input to the input terminal 2. The primary switch 100 and the secondary switch 101 are controlled according to the color motion vector effectiveness signal Mot.

That is, when the color motion vector MVt does not need to be coded, the input node S1i of the primary switch 100 is connected to the open output node S1c, and the output node S2o of the secondary switch 101 is connected to the open input node S2c.

When the color motion vector MVt is a frame-basis motion vector which needs to be coded, the input node S1i of the primary switch 100 is connected to the first output node S1a, and the output node S2o of the secondary switch 101 is connected to the first input node S2a.

Then, the motion vector MVt of the target macroblock, which has been input through the input terminal 1, is temporarily stored in the MV memory 102a. Further, in the field MV converter 110a, the frame-basis motion vector stored in the MV memory 102a is converted to the field-basis motion vectors.

When the color motion vector MVt is a field-basis motion vector which needs to be coded, the input node S1i of the primary switch 100 is connected to the second output node S1b, while the output node S2o of the secondary switch 101 connected to the second input node S2b.

Then, the motion vector MVt of the target macroblock, which has been input through the input terminal 1, is temporarily stored in the MV memory 102b. Further, in the frame MV converter 110b, the field-basis motion vectors stored in the MV memory 102b are converted to the frame-basis motion vector.

When the motion vector MVt of the target macroblock is a frame-basis motion vector, a prediction value of the frame-basis motion vector is generated in the frame MV predictor 104a, and the motion vector MVt of the target macroblock is encoded in the frame MV encoder 105a with reference to the prediction value to generate a coded signal Emvt1 of the frame-basis motion vector. The coded signal Emvt1 is output as a coded motion vector Emvt through the secondary switch 101.

Meanwhile, in the frame MV predictor 104a, when the reference macroblock is a macroblock subjected to the frame-by-frame motion compensation, the motion vector stored in the frame MV memory 102a is referred to. When the reference macroblock is a macroblock subjected to the field-by-field motion compensation, a frame-basis motion vector obtained by converting the field-basis motion vectors stored in the field MV memory 102b by the frame MV converter 110b is referred to.

On the other hand, when the motion vector MVt of the target macroblock is a field-basis motion vector, a prediction value of the field-basis motion vector is generated in the field MV predictor 104b, and the motion vector MVt of the target macroblock is encoded in the field MV encoder 105b with reference to the prediction value to generate a coded signal Emvt2 of the field-basis motion vector. This coded signal Emvt2 is output as a coded motion vector signal Emvt through the secondary switch 101.

In the field MV predictor 104b, when the reference macroblock is a macroblock subjected to the field-by-field motion compensation, the motion vector stored in the field MV memory 102b is referred to. When the reference macroblock is a macroblock subjected to the frame-by-frame motion compensation, field-basis motion vectors obtained by converting the frame-basis motion vector stored in the frame MV memory 102b by the field MV converter 110a is referred to.

FIG. 16 is a block diagram illustrating a prior art motion vector decoding unit for an interlaced color signal.

This motion vector decoding unit 2140a decodes the coded motion vector signal Emvt output from the motion vector coding unit 1170a shown in FIG. 15 to generate a decoded motion vector signal Dmvt.

The motion vector decoding unit 2140a includes a frame decoder 303a which decodes the coded signal of the frame-basis motion vector of the target macroblock by referring to the prediction motion vector obtained from the motion vector of an already decoded reference macroblock, to generate a decoded signal Dmvt1 of the frame-basis motion vector; and a field decoder 303b which decodes the coded signal of the field-basis motion vector of the target macroblock by referring to the prediction motion vector obtained from the motion vector of an already decoded reference macroblock, to generate a decoded signal Dmvt2 of the field-basis motion vector.

The motion vector decoding unit 2140a further includes a frame MV memory 304a which stores the decoded signal Dmvt1 of the frame-basis motion vector; a field MV memory 304b which stores the decoded signal Dmvt2 of the field-basis motion vector; a field MV converter 310a which converts the decoded signal of the frame-basis motion vector to the decoded signal of the field-basis motion vectors; and a frame MV converter 310b which converts the decoded signal of the field-basis motion vectors to the decoded signal of the frame-basis motion vector.

The motion vector decoding unit 2140a further includes an MV memory which stores a coding mode signal Mot indicating whether the motion vector of the target macroblock is effective or not; a frame MV predictor 305a which generates prediction value Pmvt1 of the frame-basis motion vector from a frame-basis motion vector which has already been decoded, according to the stored coding mode signal Mmot; and a field MV predictor 305b which generates a prediction value Pmvt2 of the field-basis motion vector from a field-basis motion vector which has already been decoded, according to the stored coding mode signal Mot.

The frame MV predictor 305a refers to the motion vector stored in the frame MV memory 304a when the motion vector of the already decoded reference macroblock is a frame-basis motion vector When the motion vector of the already decoded reference macroblock is a field-basis motion vector, the frame MV predictor 305a refers to a frame-basis motion vector which is obtained by converting the field-basis motion vectors stored in the field MV memory 304b by the frame MV converter 310b. The field MV predictor 305b refers to the motion vector stored in the field MV memory 304b when the motion vector of the already decoded reference macroblock is a field-basis motion vector. When the motion vector of the already decoded reference macroblock is a frame-basis motion vector, the field MV predictor 305b refers to the field-basis motion vectors obtained by converting the frame-basis motion vector stored in the frame MV memory 304a by the field MV converter 310a.

Further, the motion vector decoding unit 2140a includes a primary switch 300 having an input node S3i connected to the input terminal 13, a first output node 53a connected to the input of the frame MV decoder 303a, a second output node S3b connected to the input of the field MV decoder 303b, and a third output node S3c which is open. The primary switch 300 connects the input node S3i to any of the first to third output nodes, according to the coding mode signal Mot. The motion vector decoding unit 2140a further includes a secondary switch 301 having an output node S4o connected to the output terminal 20, a first input node 54a connected to the output of the frame MV decoder 303a, a second input node S4b connected to the output of the field MV decoder 303b, and a third input node S4c which is open. The secondary switch 301 connects the output node S4o to any of the first to third input nodes, according to the coding mode signal Mot.

A description is given of the operation.

The coded signal Emvt of the motion vector of the target macroblock is input to the input terminal 13, and the motion vector effectiveness signal Mot of the target macroblock is input to the input terminal 6. The primary switch 300 and the secondary switch 301 are controlled according to the motion vector effectiveness signal Mot.

Further, when the motion vector effectiveness signal Mot is stored in the MV memory 302, it is decided whether the motion vectors MVt1, MVt2 and MVt3 of the macroblocks to be referred to by the MV predictors 305a and 305b are encoded or not, and whether these vectors are frame-basis motion vectors or field-basis motion vectors, by the frame MV predictor 305a and the field MV predictor 305b, according to the effectiveness signal Mmot stored in the MV memory 302.

When the coded signal Emvt of the motion vector does not need to be decoded, the input node S3i of the primary switch 300 is connected to the open output node S3c, and the output node S4o of the secondary switch 301 is connected to the open input node S4c.

On the other hand, when the coded signal Emvt of the motion vector of the target macroblock is a frame-basis motion vector which needs to be decoded, the input node S3i of the primary switch 300 is connected to the first output node S3a, and the output node S4o of the secondary switch 301 is connected to the first input node S4a.

Then, the coded signal Emvt of the motion vector of the target macroblock, which has been input through the input terminal 13, is decoded in the frame MV decoder 303a with reference to the prediction motion vector Pmvt1 of the target macroblock to generate a decoded signal Dmvt1 of the motion vector. This decoded signal Dmvt1 is temporarily stored in the MV memory 304a. Further, in the field MV converter 310a, the frame-basis motion vector stored in the MV memory 304a is converted to the field-basis motion vectors.

Further, the frame MV predictor 305a performs frame-by-frame motion compensation in which a prediction motion vector of the motion vector of the target macroblock is generated by referring to the motion vector of an already decoded reference macroblock adjacent to the target macroblock. When the reference macroblock is a macroblock subjected to the frame-by-frame motion compensation, the motion vector stored in the frame MV memory 304a is referred to. When the reference macroblock is a macroblock subjected to the field-by-field motion compensation, a frame-basis motion vector obtained by converting the field-basis motion vectors stored in the field MV memory 304b by the frame MV converter 310b is referred to.

Next, when the coded signal Emvt of the motion vector of the target macroblock is a field-basis motion vector which needs to be decoded, the input node S3i of the primary switch 300 is connected to the second output node S3b, and the output node S4o of the secondary switch 301 is connected to the second input node S4b.

Then, the coded signal Emvt of the motion vector of the target macroblock, which has been input through the input terminal 13, is decoded by the field MV decoder 303b with reference to the prediction motion vector Pmvt2 of the target macroblock to generate a decoded signal Dmvt2 of the motion vector. The decoded signal Dmvt2 is temporarily stored in the MV memory 304b. Further, in the field MV converter 310b, the frame-basis motion vector stored in the MV memory 304b is converted to the field-basis motion vectors.

On the other hand, the field MV predictor 305b performs field-by-field motion compensation in which a prediction motion vector of the motion vector of the target macroblock is generated with reference to the motion vector of an already decoded reference macroblock adjacent to the target macroblock, according to the motion vector effectiveness signal of the target macroblock. In this process, when the reference macroblock is a macroblock subjected to the field-by-field motion compensation, the motion vector stored in the field MV memory 304b is referred to. When the reference macroblock is a macroblock subjected to the frame-by-frame motion compensation, a frame-basis motion vector obtained by converting the field-basis motion vectors stored in the frame MV memory by the frame MV converter 310b is referred to.

By the way, an interlaced signal used for ordinary TV broadcasting and a non-interlaced color signal or shape signal used for internet or data base are expected to be widely utilized in various fields in the future. However, it is thought that the applicable field of an interlaced shape signal would not be so wide.

As for "Next Generation TV" which has been much talked about in recent years, there is a high possibility of adopting non-interlacing and, therefore, from the practical point of view, it is not desired that the structures of coding and decoding apparatuses are complicated due to coding of an interlaced shape signal whose applicable field is not so wide.

Therefore, in order to realize coding and decoding of an interlaced shape signal without complicating the structures of coding and decoding apparatuses, the circuit structure for coding or decoding an interlaced color signal may be combined with the circuit structure for coding or decoding a non-interlaced shape signal.

So, in order to realize coding and decoding of an interlaced shape signal without complicating the structures of coding and decoding apparatuses, the circuit structure for coding or decoding an interlaced color signal may be combined with the circuit structure for coding or decoding a non-interlaced shape signal.

However, if non-interlace coding is performed to an interlaced shape signal, motion compensation of the interlaced shape signal would be performed frame by frame in accordance with the non-interlacing. In this case, when the color signal is an interlaced signal, there are two kinds of motion vectors relating to the color signal, i.e., a field-basis motion vector and a frame-basis motion vector. Therefore, it is difficult to perform coding of the shape motion vector with reference to the color motion vector as in the prior art motion vector coding.

SUMMARY OF THE INVENTION

It is an object of the present invention to provide an image coding apparatus and an image decoding apparatus, and an image coding method and an image decoding method, wherein coding and decoding of a motion vector of a non-interlaced shape signal can be performed with extension of a circuit structure minimized and together with coding and decoding of a motion vector of an interlaced color signal, and a data storage medium which stores an image processing program which makes a computer perform coding or decoding of a motion vector of an interlaced shape signal according to the image coding method or the image decoding method.

Other objects and advantages of the present invention will become apparent from the detailed description given hereinafter It should be understood, however, that the detailed description and specific embodiment are given by way of illustration only, since various changes and modifications within the scope of the invention will become apparent to those skilled in the art from this detailed description.

According to a first aspect of the present invention, an image coding apparatus which receives an interlaced image signal comprising a color signal for color display of an object and a shape signal indicating a shape of the object and corresponding to the object included in an image space as an input and performs an adaptive coding process including a frame-by-frame motion compensation coding process and a field-by-field motion compensation coding process for the image signal in macroblock units each comprising a predetermined number of pixels into which the image space is divided, comprises; a color motion vector coding unit for coding either a frame-basis color motion vector or a field-basis color motion vector of a target macroblock to be coded which is used in either the frame-by-frame motion compensation coding process or the field-by-field motion compensation coding process for an interlaced color signal, based on its prediction value; and a shape motion vector coding unit for coding a frame-basis shape motion vector of the target macroblock which is used in the frame-by-frame motion compensation coding process for an interlaced shape signal, based on a prediction value obtained from a color motion vector and a shape motion vector of a coded macroblock; wherein the color motion vector coding unit includes motion vector conversion means for converting field-basis color motion vectors of the coded macroblock into a frame-basis color motion vector of the coded macroblock, and the shape motion vector coding unit includes a shape motion vector predictor for generating the prediction value of the shape motion vector of the target macroblock based on the frame-basis shape motion vector of the coded macroblock and the frame-basis color motion vector of the coded macroblock output from the motion vector conversion means when the color motion vector of the coded macroblock is the field-basis motion vector. Therefore, the motion vector of the non-interlaced shape signal can be coded with extension of a circuit structure minimized and together with a coding process for the motion vector of the interlaced color signal.

According to a second aspect of the present invention, an image coding apparatus which receives an interlaced image signal comprising a color signal for color display of an object and a shape signal indicating a shape of the object and corresponding to the object included in an image space as an input and performs an adaptive coding process including a frame-by-frame motion compensation coding process and a field-by-field motion compensation coding process for the image signal in macroblock units each comprising a predetermined number of pixels into which the image space is divided, comprises: a color motion vector coding unit for coding either a frame-basis color motion vector or a field-basis color motion vector of a target macroblock to be coded which is used in either the frame-by-frame motion compensation coding process or the field-by-field motion compensation coding process for an interlaced color signal, based on its prediction value; and a shape motion vector coding unit for coding a frame-basis shape motion vector of the target macroblock which is used in the frame-by-frame motion compensation coding process for an interlaced shape signal, based on its prediction value; wherein the shape motion vector coding unit includes a shape motion predictor which generates the prediction value of the shape motion vector of the target macroblock based on a color motion vector and a shape motion vector of a coded macroblock when the color motion vector of the coded macroblock is the frame-basis motion vector, and generates the prediction value of the shape motion vector of the target macroblock based on a frame-basis shape motion vector of the coded macroblock when the color motion vector of the coded macroblock is the field-basis motion vector Therefore, when the prediction value of the shape motion vector is generated, the field-basis color motion vector of the coded macroblock is not ref erred to, and consequently, the process for converting the field-basis color motion vectors into the frame-basis color motion vector can be dispensed with in the process for coding the color motion vector when the color motion vectors of the target macroblock and the coded macroblock are the field-basis motion vectors.

According to a third aspect of the present invention, an image coding apparatus which receives either an interlaced image signal or a non-interlaced image signal comprising a color signal for color display of an object and a shape signal indicating a shape of the object and corresponding to the object included in an image space as an input and performs an adaptive coding process including a frame-by-frame motion compensation coding process and a field-by-field motion compensation coding process for the image signal in macroblock units each comprising a predetermined number of pixels into which the image space is divided, comprises: a color motion vector coding unit for coding either a frame-basis color motion vector or a field-basis color motion vector of a target macroblock to be coded which is used in either a frame-by-frame motion compensation coding process or a field-by-field motion compensation coding process for a color signal, based on its prediction value; and a shape motion vector coding unit for coding a frame-basis shape motion vector of the target macroblock which is used in the frame-by-frame motion compensation coding process for a non-interlaced shape signal, based on its prediction value; wherein the shape motion vector coding unit includes a shape motion vector predictor for generating the prediction value of the shape motion vector of the target macroblock based on a color motion vector and a shape motion vector of a coded macroblock when the non-interlaced image signal is received as the image signal, and generates the prediction value of the shape motion vector of the target macroblock based on a frame-basis shape motion vector of the coded macroblock when the interlaced image signal is received as the image signal. Therefore, when the input image signal is the interlaced image signal, the decision process for deciding whether the color motion vector of the reference macroblock is the field-basis motion vector or the frame-basis motion vector may be dispensed with in the process for coding the shape motion vector, and correspondingly the amount of signal processing for the decision process can be reduced.

According to a fourth aspect of the present invention, an image decoding apparatus which receives a coded image signal corresponding to an interlaced image signal comprising a color signal for color display of an object and a shape signal indicating a shape of the object and corresponding to the object included in an image space as an input and performs an adaptive decoding process including a frame-by-frame motion compensation decoding process and a field-by-field motion compensation decoding process for the coded image signal in macroblock units each comprising a predetermined number of pixels into which the image space is divided, comprises: a color motion vector decoding unit for decoding either a frame-basis color motion vector or a field-basis color motion vector of a target macroblock to be decoded which is used in either the frame-by-frame motion compensation decoding process or the field-by-field motion compensation decoding process for a coded signal of an interlaced color signal, based on its prediction value; and a shape motion vector decoding unit for decoding a frame-basis shape motion vector of the target macroblock which is used in the frame-by-frame motion compensation decoding process for a coded signal of an interlaced shape signal, based on a prediction value obtained from a color motion vector and a shape motion vector of a decoded macroblock; wherein the color motion vector decoding unit includes motion vector conversion means for converting field-basis color motion vectors of the decoded macroblock into a frame-basis color motion vector of the decoded macroblock, and the shape motion vector decoding unit includes a shape motion vector predictor for generating the prediction value of the shape motion vector of the target macroblock based on the frame-basis shape motion vector of the decoded macroblock and the frame-basis color motion vector of the decoded macroblock output from the motion vector conversion means when the color motion vector of the decoded macroblock is the field-basis motion vector. Therefore, the motion vector of the non-interlaced shape signal can be decoded with extension of a circuit structure minimized and together with a decoding process for the motion vector of the interlaced color signal.

According to a fifth embodiment of the present invention, an image decoding apparatus which receives a coded image signal corresponding to an interlaced image signal comprising a color signal for color display of an object and a shape signal indicating a shape of the object and corresponding to the object included in an image space as an input and performs an adaptive decoding process including a frame-by-frame motion compensation decoding process and a field-by-field motion compensation decoding process for the coded image signal in macroblock units each comprising a predetermined number of pixels into which the image space is divided, comprises: a color motion vector decoding unit for decoding either a frame-basis color motion vector or a field-basis color motion vector of a target macroblock to be decoded which is used in either a frame-by-frame motion compensation decoding process or a field-by-field motion compensation decoding process for a coded signal of an interlaced color signal, based on its prediction value; and a shape motion vector decoding unit for decoding a frame-basis shape motion vector of the target macroblock which is used in the frame-by-frame motion compensation decoding process for a coded signal of an interlaced shape signal, based on its prediction value; wherein the shape motion vector decoding unit includes a shape motion vector predictor which generates the prediction value of the shape motion vector of the target macroblock based on a color motion vector and a shape motion vector of a decoded macroblock when the color motion vector of the decoded macroblock is the frame-basis motion vector, and generates the prediction value of the shape motion vector of the target macroblock based on a frame-basis shape motion vector of the decoded macroblock when the color motion vector of the decoded macroblock is the field-basis motion vector. Therefore, when the prediction value of the shape motion vector is generated, the field-basis color motion vector of the decoded macroblock is not referred to, and consequently, the process for converting the field-basis color motion vectors into the frame-basis color motion vector can be dispensed with in the process for decoding the color motion vector when the color motion vectors of the target macroblock and the coded macroblock are the field-basis motion vectors.

According to a sixth aspect of the present invention, an image decoding apparatus which receives a coded image signal corresponding to either an interlaced image signal or a non-interlaced image signal comprising a color signal for color display of an object and a shape signal indicating a shape of the object and corresponding to the object included in an image space as an input and performs an adaptive decoding process including a frame-by-frame motion compensation decoding process and a field-by-field motion compensation decoding process for the coded image signal in macroblock units each comprising a predetermined number of pixels into which the image space is divided, comprises: a color motion vector decoding unit for decoding either a frame-basis color motion vector or a field-basis color motion vector of a target macroblock to be decoded which is used in either a frame-by-frame motion compensation decoding process or a field-by-field motion compensation decoding process for a coded signal of the color signal, based on its prediction value; and a shape motion vector decoding unit for decoding a frame-basis shape motion vector of the target macroblock which is used in the frame-by-frame motion compensation decoding process for a coded signal of a non-interlaced shape signal, based on its prediction value; wherein the shape motion vector decoding unit includes a shape motion vector predictor for generating the prediction value of the shape motion vector of the target macroblock based on a color motion vector and a shape motion vector of a decoded macroblock when the coded image signal of the non-interlaced image signal is received as the coded image signal, and generates the prediction value of the shape motion vector of the target macroblock based on a frame-basis shape motion vector of the decoded macroblock when the coded image signal of the interlaced image signal is received as the coded image signal. Therefore, when the input image signal is the interlaced image signal, the decision process for deciding whether the color motion vector of the reference macroblock is the field-basis motion vector or the frame-basis motion vector may be dispensed with in the process for decoding the shape motion vector, and correspondingly the amount of signal processing for the decision process can be reduced.

BRIEF DESCRIPTION OF THE DRAWINGS

FIGS. 8(a)–8(f) are diagrams for explaining an object-by-object coding process according to MPEG4, wherein FIG. 8(a) shows an image space Tc obtained from a color signal, FIG. 8(b) shows an image space Ss obtained from a shape signal, FIGS. 8(c) and 8(e) show a blocking process for the color signal, and FIGS. 8(d) and 8(f) show a blocking process for a shape signal.

FIGS. 11(a)–11(d) are diagrams showing correspondence between macroblocks and motion vectors, wherein FIG. 11(a) shows a macroblock having four motion vectors, FIG. 11(b) shows a macroblock having two motion vectors, FIG. 11(c) shows sub-macroblocks corresponding to respective fields in the macroblock, and FIG. 11(d) shows a macroblock having one motion vector.

FIGS. 12(a)–12(d) are diagrams for explaining a process for predicting a motion vector, wherein FIG. 12(a) shows a target macroblock to-be-processed corresponding to a color signal having four motion vectors, FIG. 12(b) shows a target macroblock corresponding to the color signal having one motion vector, FIG. 12(c) shows a target macroblock corresponding to the color signal having two motion vectors, and FIG. 12(d) shows a process for predicting a motion vector of a shape signal.

DETAILED DESCRIPTION OF THE PREFERRED EMBODIMENTS

Now, a description will be given of preferred embodiments of the present invention.

Embodiment 1

Figure 1:
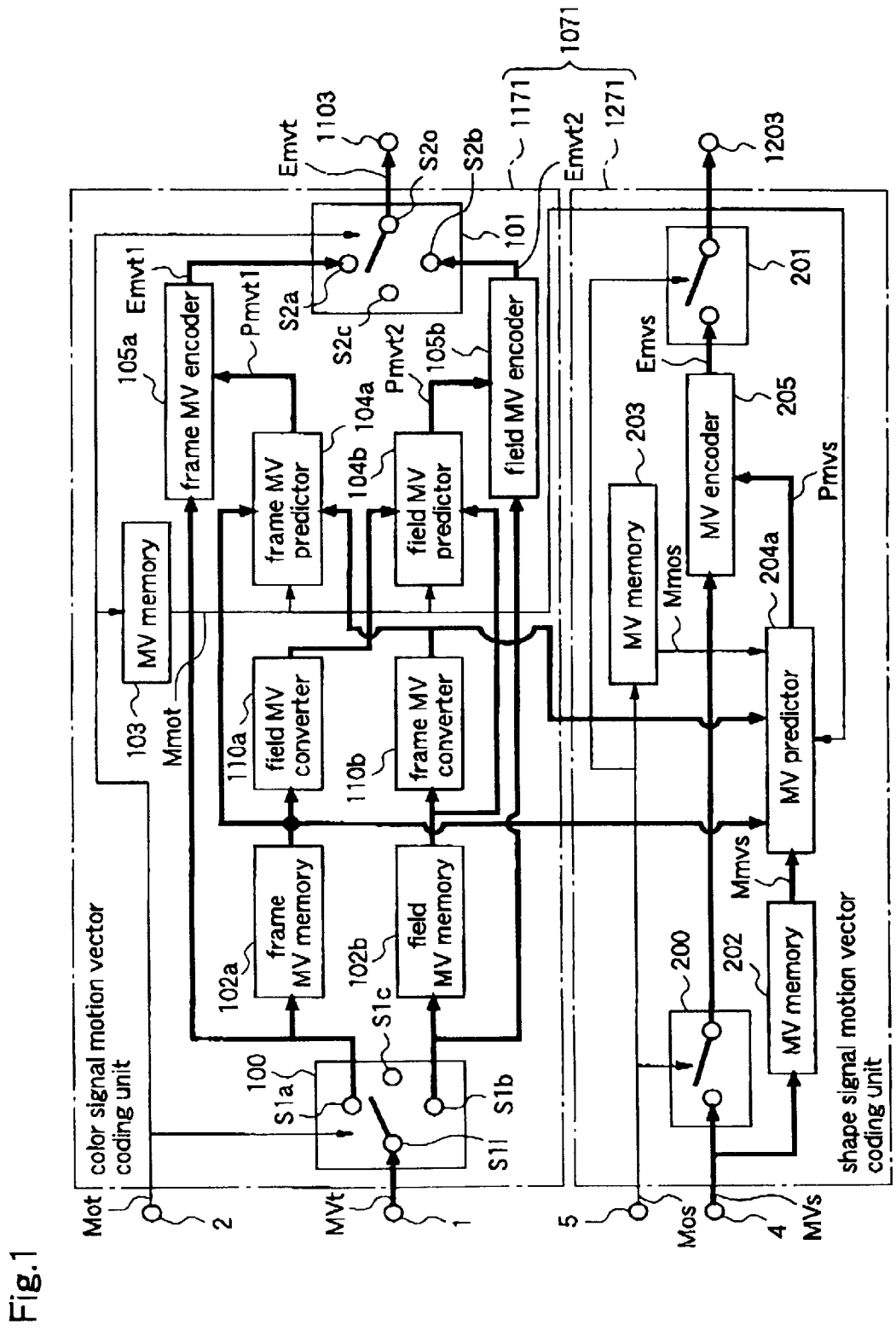
FIG. 1 is a block diagram showing an image coding apparatus according to a first embodiment of the present invention, wherein a motion vector coding unit included in the image coding apparatus is shown.

FIG. 1 is a block diagram for explaining a motion vector coding unit included in an image coding apparatus according to a first embodiment of the present invention.

The image coding apparatus of the first embodiment is an image coding apparatus which performs coding to an interlaced image signal according to MPEG4. The image coding apparatus of the first embodiment includes a motion vector coding apparatus 1071 for the interlaced image signal, which has replaced the color signal motion vector coding unit 1170 and the shape signal motion vector coding unit 1270 included in the prior art image coding apparatus 1000 shown in FIG. 9.

The interlaced image signal comprises an interlaced color signal for color display of an object corresponding to a image on a frame, an interlaced shape signal indicating a shape of the object, and an interlaced transparency signal indicating a composition ratio in which the object and another image are to be composited. Therefore, the image coding apparatus comprises a color coding section which performs coding to the interlaced color signal, a shape coding section which performs coding to the interlaced shape signal, and a transparency coding section which performs coding to the interlaced transparency signal. The construction of the transparency coding unit is similar to that of the color coding unit, and is irrelevant to the present invention. Therefore, this will not be discussed herein.

Turning now to FIG. 1, a motion vector coding unit 1071 of the first embodiment comprises a color motion vector coding unit 1171 included in the color coding section and a shape motion vector coding unit 1271 included in the shape coding section.

Figure 9:
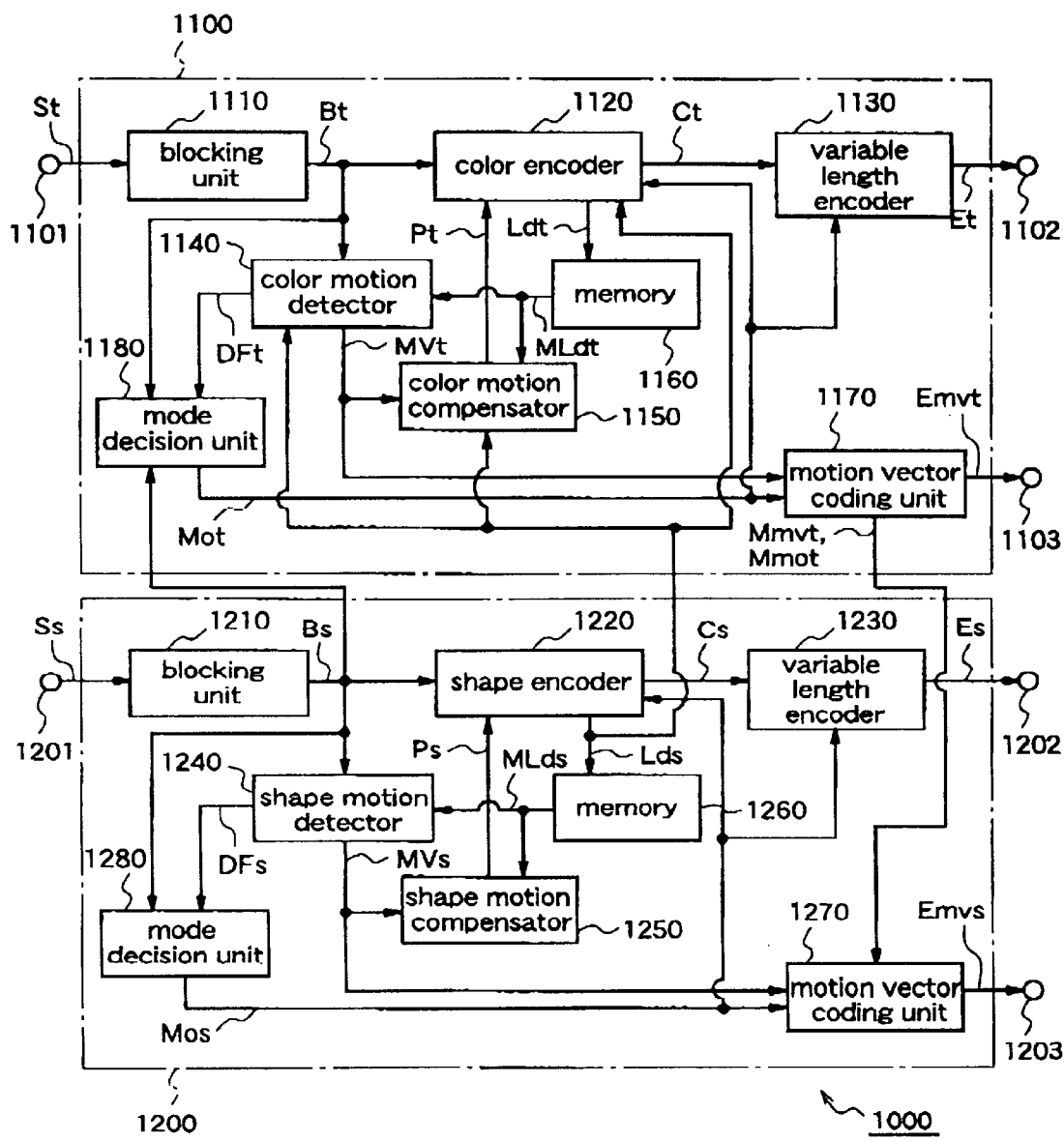
FIG. 9 is a block diagram for explaining a prior art image coding apparatus according to MPEG4.
Figure 15:
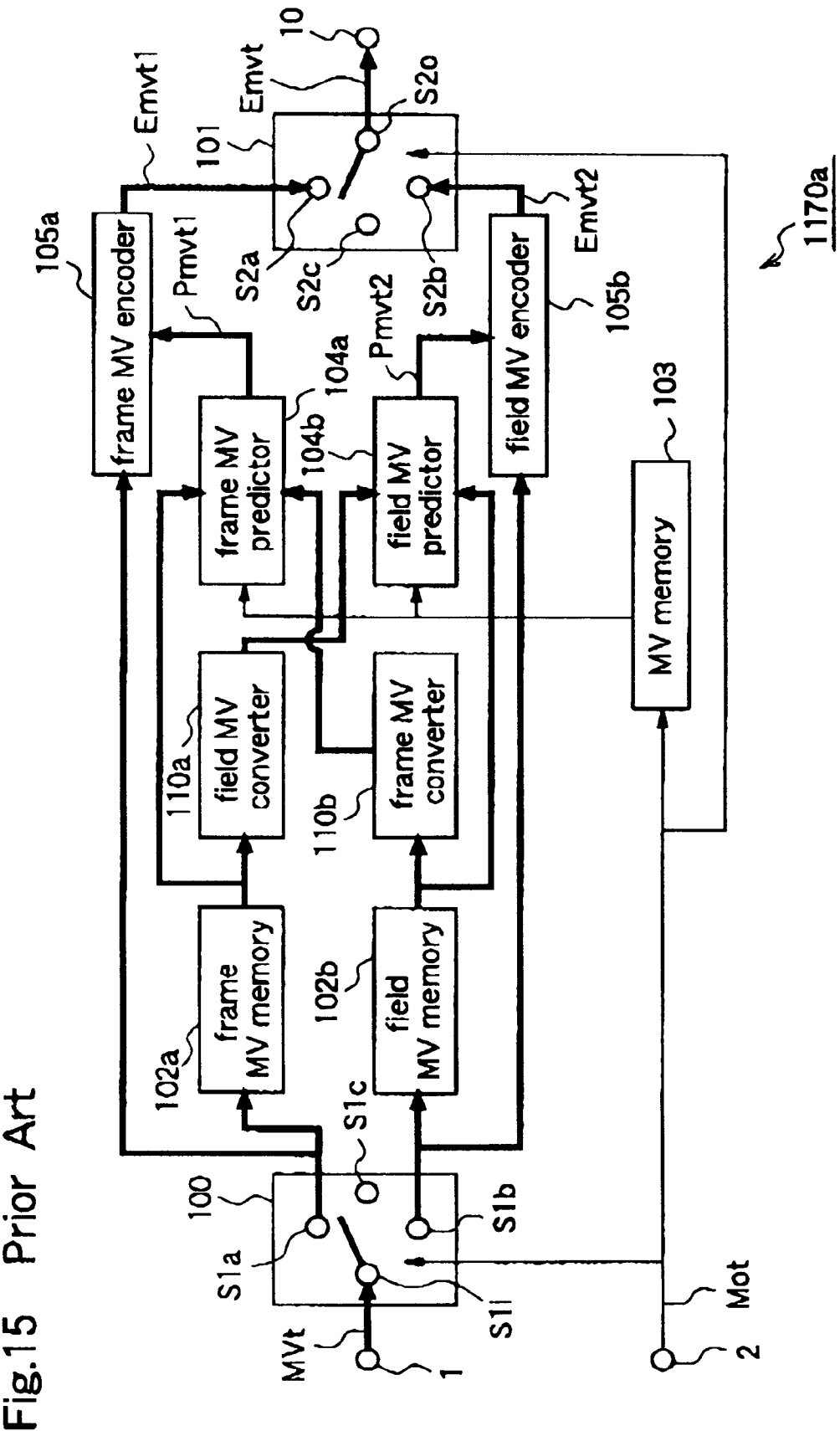
FIG. 15 is a block diagram showing a prior art motion vector coding unit for an interlaced image signal.

In this first embodiment, the construction of the color coding section is almost identical to that of the color coding section 1100 in FIG. 9, and in a motion compensation coding process for the interlaced color signal, switching between the frame-by-frame motion compensation process and the field-by-field motion compensation process is adaptively performed. The construction of the color motion vector coding unit 1171 is identical to that of the color motion vector coding unit according to the prior art in FIG. 15.

The field converter 110a and the frame converter 110b have not been discussed in the prior art description. In this embodiment, a field MV converter 110a included in the color motion vector coding unit 1171 is adapted to receive a frame-basis color motion vector (frame CMV) of a macroblock which has been subjected to the frame-by-frame motion compensation process from a frame MV memory 102a and output two motion vectors identical to the frame CMV as color motion vectors (field CMV) of respective fields composing the frame. A frame MV converter 110b included in the color motion vector coding unit 1171 is adapted to receive two field-basis color motion vectors (field CMV1 and field CMV2) of a macroblock which has been subjected to the field-by-field motion compensation process from a field MV memory 102b and output a motion vector resulting from averaging the field CMV1 and the field CMV2 as the color motion vector (frame CMV) of a frame composed of these fields.

While in the frame MV converter 110b, the average of the motion vectors of the fields is converted into the frame-basis motion vector, when a sub-macroblock corresponding to one field is positioned outside the object, a motion vector of a sub-macroblock corresponding to the other field (sub-macroblock positioned inside the object) may be used as the motion vector of the corresponding macroblock in the frame. In this case, the motion vectors of respective fields need not be averaged, and the motion vector to-be-referred to is not affected by the motion vector of the sub-macroblock outside the object having an insignificant value. In particular, in a case in which the output of the frame MV converter 110b is shared by the frame MV predictor 104a included in the color motion vector coding unit 1171 and an MV predictor 204a included in the shape motion vector coding unit 1271, signal processing for averaging the motion vectors can be reduced and prediction precision is improved.

The shape coding section of the first embodiment differs from the prior art shape coding section 1200 shown in FIG. 9 in the construction of the shape motion vector coding unit 1271. To be specific, the shape coding section of the first embodiment is adapted to convert the interlaced shape signal included in the interlaced image signal into a progressive shape signal and perform coding to the progressive shape signal. In brief, the shape coding section is adapted to perform the frame-by-frame motion compensation coding process in the inter-frame coding process.

Figure 13:
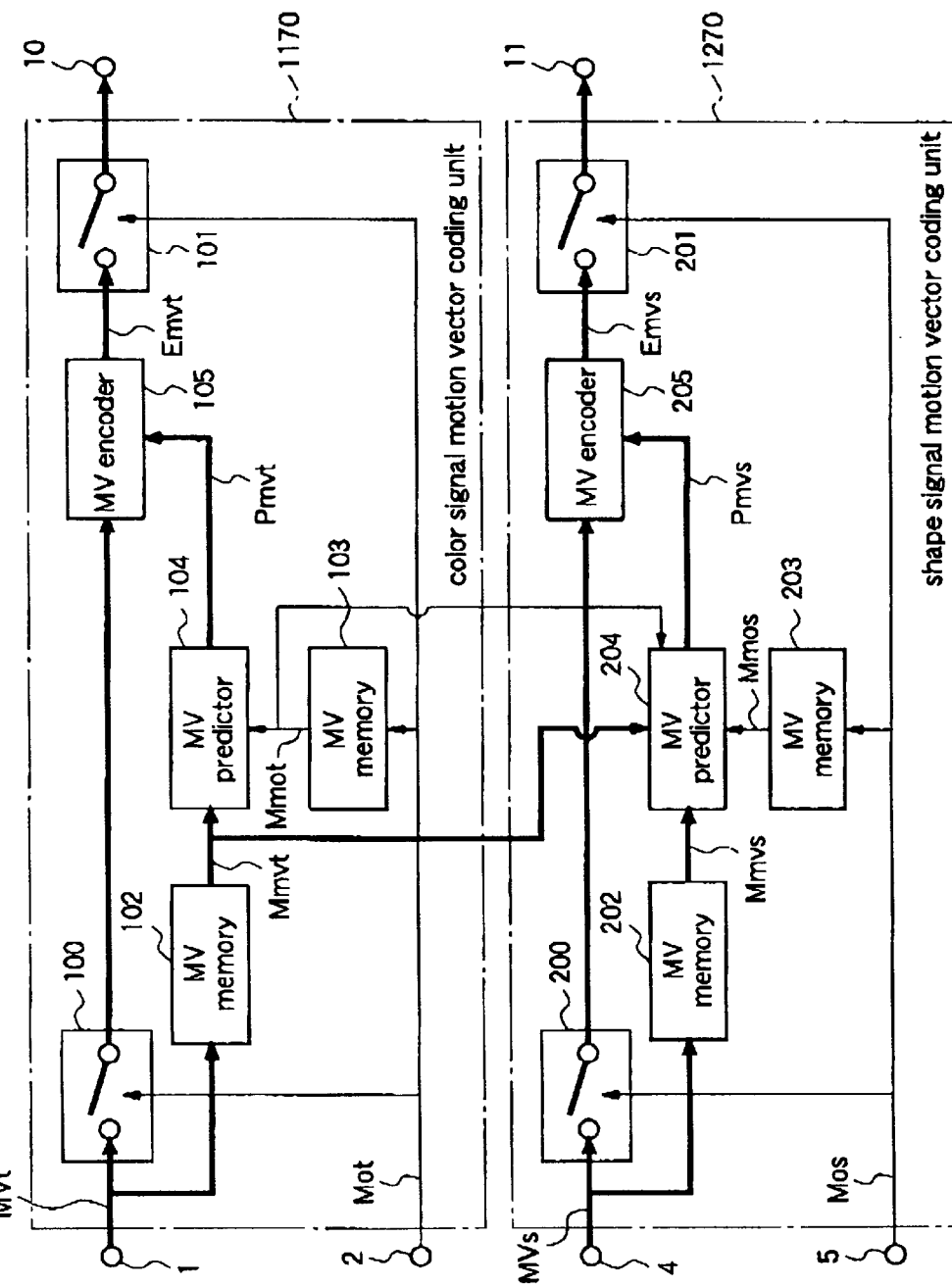
FIG. 13 is a block diagram for explaining a prior art motion vector coding unit.

The shape motion vector coding unit 1271 includes an MV predictor 204a which generates the prediction value of the shape motion vector of the target macroblock with reference to the frame-basis color motion vector stored in the frame MV memory 102a included in the color motion vector coding unit 1171 and the frame-basis color motion vector output from the frame MV converter 110b, which has replaced the MV predictor 204 included in the shape motion vector coding unit 1270 shown in FIG. 13. The MV predictor 204a is adapted to convert a 0.5 pixel-precision color motion vector sent from the frame MV memory 102a into one pixel-precision color motion vector and perform a prediction process by the use of the resulting one-pixel precision. This is because the color coding section performs the motion compensation process by the use of the 0.5 pixel-precision and the shape coding section performs the motion compensation process by the use of the one-pixel precision.

When the MV predictor 204a generates the prediction value of the shape motion vector MVs0 of the target macroblock MBs0 in FIG. 12(d), reference macroblocks in the image space (shape image space) obtained from the shape signal, macroblocks RMbs1–RMBs3 adjacent to the target macroblock MBs0 are selected. As the motion vectors to be referred to, motion vectors Mv1–MVs3 of the macroblock RMBs1–RMBs3 are used. On the other hand, in the image space (color image space) obtained from the color signal, the reference macroblocks adjacent to the macroblock MB0 corresponding to the target macroblock MBs0 are not always the macroblocks which have been subjected to the frame-by-frame motion compensation process. Therefore, when the reference macroblock is the macroblock which has been subjected to the frame-by-frame motion compensation process, the motion vectors stored in the frame MV memory 102a are referred to, while the reference macroblock is the macroblock which has been subjected to the field-by-field motion compensation process, the frame-basis motion vector resulting from converting the field-basis motion vectors stored in the field MV memory 102b into the frame-basis motion vector by the use of the frame MV converter 110b.

The MV predictor 204a decides whether or not each of the motion vectors MVt1, MVt2, and MVt3 of the reference blocks is the coded motion vector, that is, each of the reference macroblocks is the inter-macroblock which has been inter-frame coded, according to a motion vector effectiveness signal Mmot output from an MV memory 103.

As for the macroblocks RMBs1–RMBs3 adjacent to the target macroblock MBs0 in the shape image space, corresponding to the intra-macroblocks or the macroblocks outside the object, the corresponding motion vectors are not referred to in the process for generating the prediction value of the motion vector. Likewise, as for the blocks RB1–RB3 adjacent to the target macroblock MB0 in the color image space corresponding to the intra-macroblocks or the macroblocks outside the object, the corresponding motion vectors are not referred to in the process for generating the prediction value of the motion vector, either.

Subsequently, operation and effects will be described.

The operation of the image coding apparatus of the first embodiment differs from that of the prior art image coding apparatus 1000 only in the operation of the motion vector coding unit 1071 and the operation of the motion vector coding unit 1071 differs from the prior art motion vector coding unit in the operation of the shape motion vector coding unit 1071. Therefore, the color motion vector coding unit 1171 is identical to the prior art color motion vector coding unit 1170.

The MV predictor 204 included in the prior art shape motion vector coding unit 1270 shown in FIG. 13 refers to the motion vectors MVt1, MVt2, and MVt3 stored in the MV memory 102 as the color vectors when it generates the prediction value of the shape motion vector of the target macroblock.

On the other hand, in the color coding section for the interlaced color signal, since switching between the frame-by-frame motion vector compensation coding process and the field-by-field motion compensation coding process is adaptively performed, two types of motion vectors (field-basis and frame-basis motion vectors) are generated.

In this case, the shape motion vector to be referred to by the MV predictor 204 is the frame-basis motion vector, and therefore the MV predictor 204 cannot refer to the field-basis color motion vector.

The MV predictor 204a included in the shape motion vector coding unit 1271 of the first embodiment, generates the prediction value of the shape motion vector of the target macroblock in the shape image space with reference to the motion vectors stored in the frame MV memory 102a included in the color motion vector coding unit 1171 when the reference macroblock in the color image space has been subjected to the frame-by-frame motion compensation process. On the other hand, when the reference macroblock has been subjected to the field-by-field motion compensation process, the MV predictor 204a refers to the frame-basis motion vector obtained by converting the field-basis motion vectors stored in the field MV memory 102b in the color motion vector coding unit 1171 by the use of the frame MV converter 110b.

Therefore, the MV predictor 104a included in the shape motion vector coding unit 1271 always refers to the frame-basis motion vector, regardless of whether the reference macroblock is the macroblock which has been subjected to the field-by-field motion compensation process or the frame-by-frame motion compensation process.

In this manner, the motion vector coding unit 1171 included in the image coding apparatus which performs the motion compensation process for the interlaced image signal generates the prediction value of the shape motion vector of the target macroblock in the shape image space with reference to the color motion vector of the macroblock in the color image space, like the motion vector coding unit included in the image coding apparatus which performs the motion compensation coding process for the non-interlaced image signal.

Thus, in accordance with the first embodiment, the image coding apparatus which adaptively performs switching between the frame-by-frame motion compensation coding process and the field-by-field motion compensation coding process when performing the motion compensation coding process for the interlaced image signal including the color signal and the shape signal corresponding to the object, includes the MV predictor 204a which generates the prediction value of the shape motion vector with reference to the color motion vectors, i.e., the output of the frame MV converter 110b which converts the field-basis color motion vectors into the frame-basis motion vector when the reference color motion vector corresponds to the motion vector which has been subjected to the field-by-field motion compensation coding process. Therefore, in the process for predicting the shape motion vector performed by the shape coding section which always performs the frame-by-frame motion compensation coding process, the color motion vectors of the interlaced color signal can be referred to.

For the above reason, the construction of the shape motion vector coding unit is made identical to that of the color motion vector coding unit. To be specific, without the need for the motion vector coding means for the frame-basis motion vectors and the field-basis motion vectors and by altering the construction of the MV predictor included in the prior art shape motion vector coding unit, the simplified circuit construction of the shape motion vector coding unit which generates the prediction value of the shape motion vector with reference to the color motion vector can be realized, for the image coding apparatus which performs the motion compensation coding process for the interlaced image signal corresponding to the object.

In the first embodiment, the description has been given without distinguishing between the case where the reference macroblock in the color image space has one motion vector and the case where it has four motion vectors, because the motion vectors to-be-referred to are the same in either case.

To be more detailed, when the reference macroblock has one motion vector, it is assumed that the four motion vectors of the four blocks composing the macroblock are equivalent. Hence, in either case, for the target macroblock MBs0 (see FIG. 12(d)) in the shape image space, motion vectors MVt1–MVt3 of the blocks RB1–RB3 adjacent to the target macroblock MB0 (see FIG. 12(c)) in the color image space are used.

Embodiment 2

Figure 2:
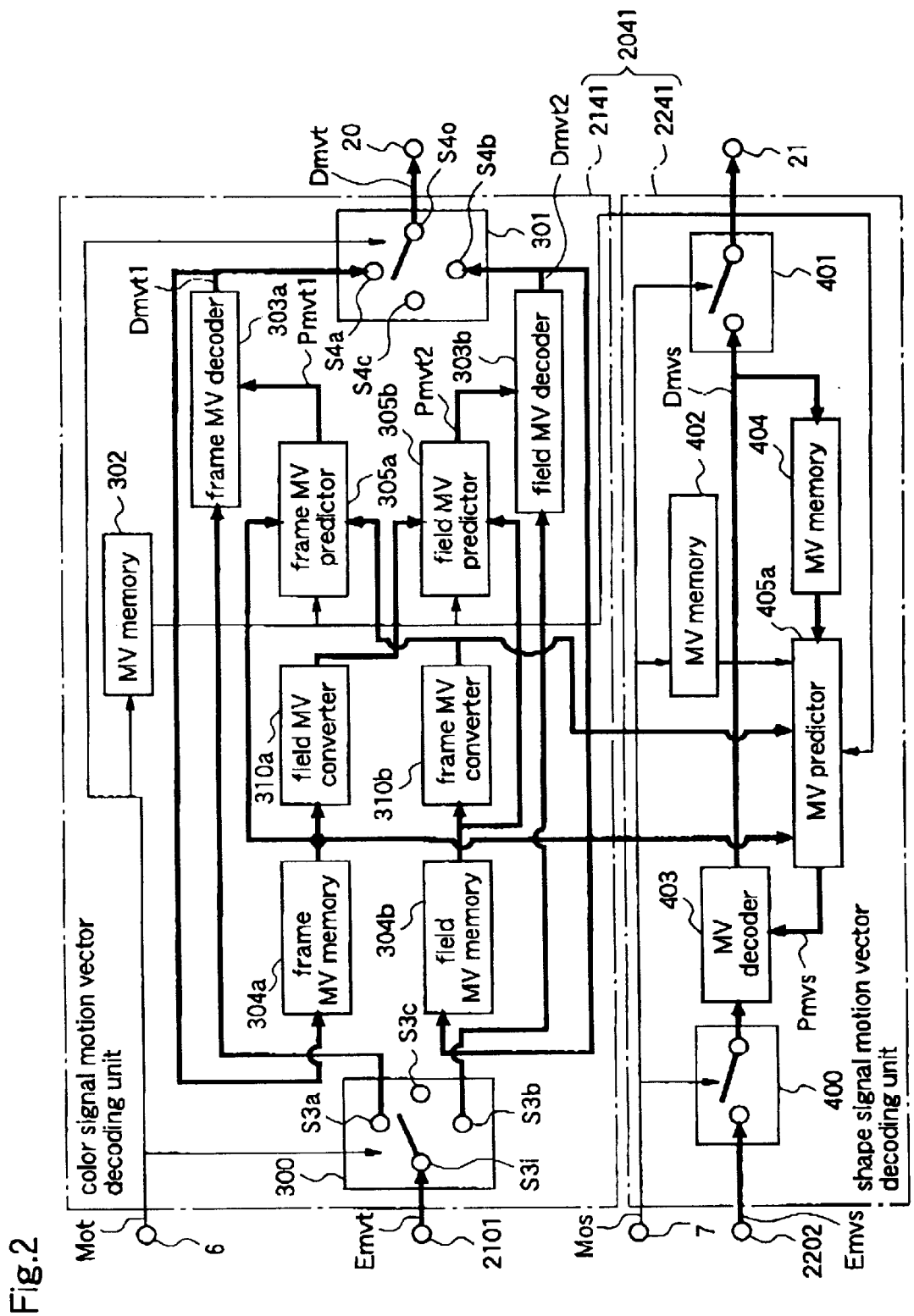
FIG. 2 is a block diagram showing an image decoding apparatus according to a second embodiment of the present invention, wherein a motion vector decoding unit included in the image decoding apparatus is shown.

FIG. 2 is a block diagram showing a motion vector coding unit included in an image decoding apparatus according to a second embodiment of the present invention.

The image decoding apparatus of the second embodiment is an image decoding apparatus which decodes the coded signal obtained by coding the interlaced image signal according to MPEG4. The image decoding apparatus of the second embodiment includes a motion vector decoding unit 2041 for the interlaced image signal which has replaced the color signal motion vector decoding unit 2140 and the shape signal motion vector coding unit 2240 included in the prior art image decoding apparatus 2000 shown in FIG. 10. The image decoding apparatus comprises a color decoding section which decodes the interlaced color signal, a shape decoding section which decodes the interlaced shape signal, and a transparency decoding section which decodes the interlaced transparency signal. The transparency decoding section is almost identical to that of the color decoding section and is irrelevant to the present invention. Therefore, this will not be discussed herein.

The motion vector decoding unit 2041 includes a color motion vector decoding unit 2141 included in the color decoding section and a shape motion vector decoding unit 2241 included in the shape decoding section.

Figure 10:
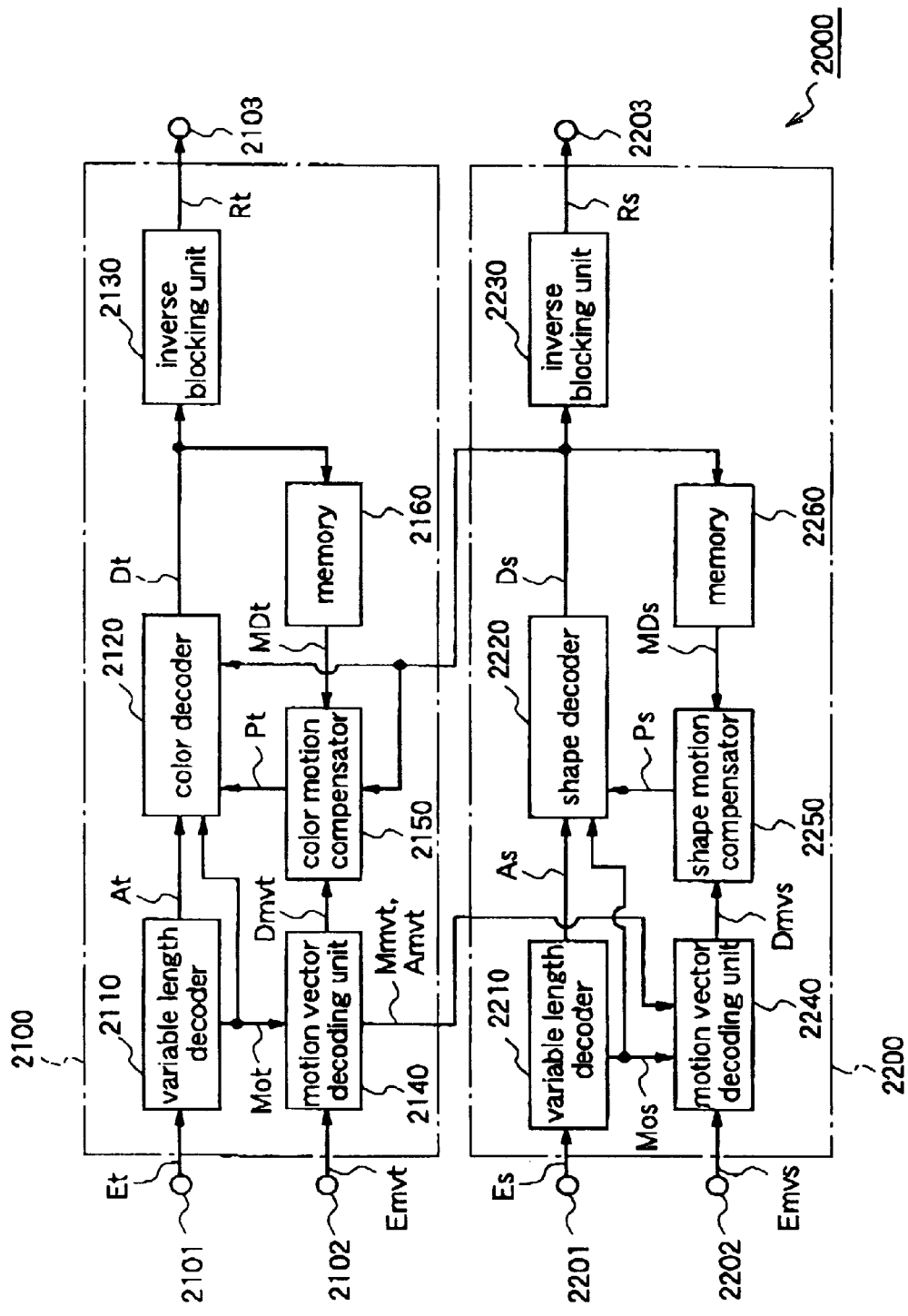
FIG. 10 is a block diagram for explaining a prior art image decoding apparatus according to MPEG4.
Figure 11:
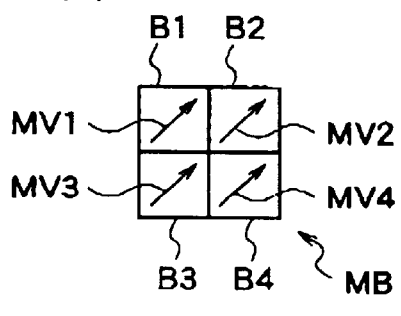
Figure 11:
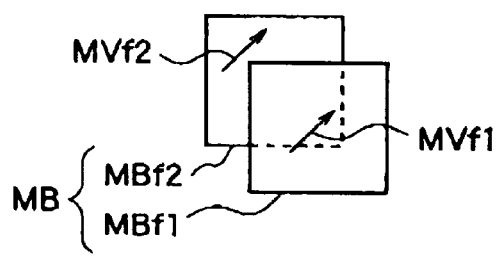
Figure 11:
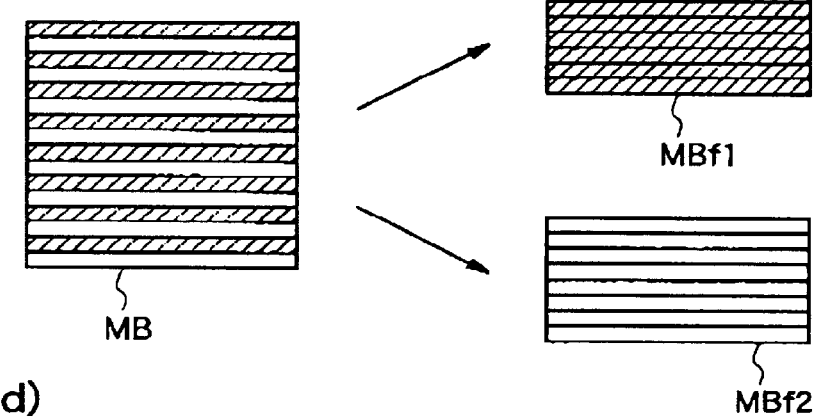
Figure 11:
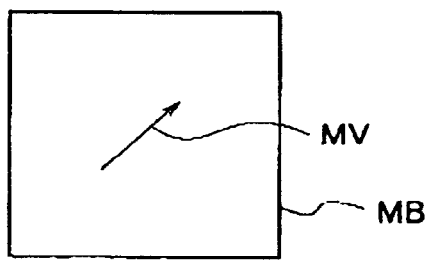
Figure 16:
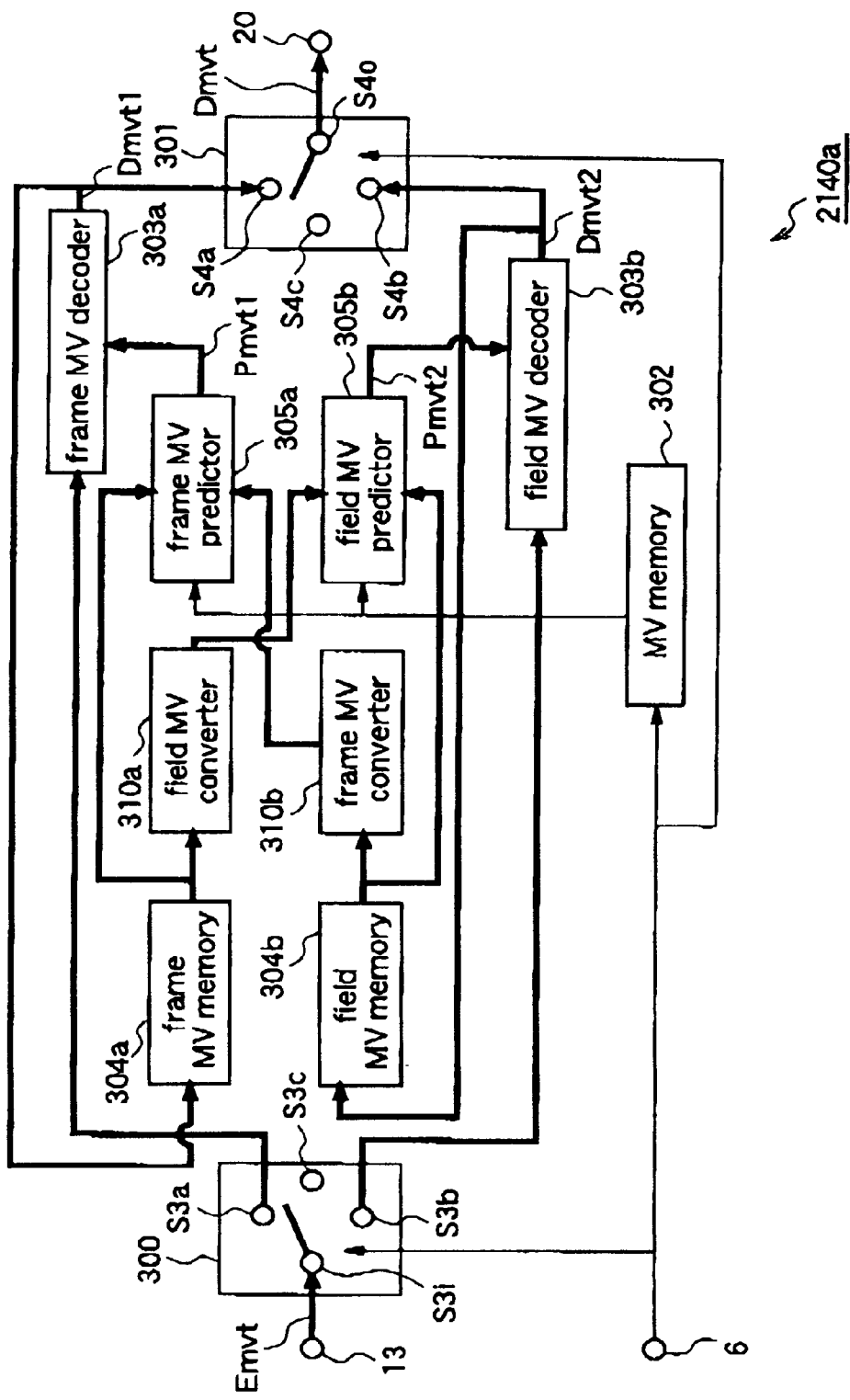
FIG. 16 is a block diagram showing a prior art motion vector decoding unit for the interlaced image signal.

The construction of color decoding section is almost identical to that of the color decoding section 2100 shown in FIG. 10, and in a motion compensation decoding process for the coded signal obtained by coding the interlaced color signal, switching between the frame-by-frame motion compensation process and the field-by-field motion compensation process is adaptively performed. The construction of the color motion vector decoding unit 2141 is identical to that of the prior art color motion vector decoding unit 2140*a* shown in FIG. 16.

The field converter 310*a* and the frame converter 310*b* have not been discussed in the prior art description. In this embodiment, a field MV converter 310*a* included in the color motion vector decoding unit 2141 is adapted to receive a frame-basis color motion vector (frame CMV) of a macroblock which has been subjected to the frame-by-frame motion compensation process from a frame MV memory 304*a* and output two motion vectors identical to the frame CMV as color motion vectors (field CMV) of respective fields composing the frame. A frame MV converter 310*b* included in the color motion vector coding unit 2141 is adapted to receive two field-basis color motion vectors (field CMV1 and field CMV2) of a macroblock which has been subjected to the field-by-field motion compensation process from a field MV memory 304*b* and output a motion vector resulting from averaging the field CMV1 and the field CMV2 as the color motion vector (frame CMV) of a frame composed of these fields.

While in the frame MV converter 310*b*, the average of the motion vectors of the fields is converted into the frame-basis motion vector, when a sub-macroblock corresponding to one field is positioned outside the object, a motion vector of a sub-macroblock corresponding to the other field (sub-macroblock positioned inside the object) may be used as the motion vector of the corresponding macroblock in the frame. In this case, the motion vectors of respective fields need not be averaged, and the motion vector to-be-referred to is not affected by the motion vector of the sub-macroblock outside the object having an insignificant value. In particular, in a case where the output of the frame MV converter 310*b* is shared by the frame MV predictor 305*a* included in the color motion vector decoding unit 2141 and the MV predictor 405*a* included in the shape motion vector decoding unit 2241, signal processing for averaging the motion vectors can be reduced and prediction precision is improved.

The shape decoding section of the second embodiment differs from the prior art shape decoding section 2200 in FIG. 10 in the construction of the shape motion vector decoding unit 2200. To be specific, the shape decoding section of the second embodiment is adapted to decode the coded shape signal obtained by coding the progressive signal by the use of the shape coding section of the first embodiment. In brief, the shape decoding section is adapted to perform the frame-by-frame motion compensation decoding process in the inter-frame decoding process.

Figure 14:
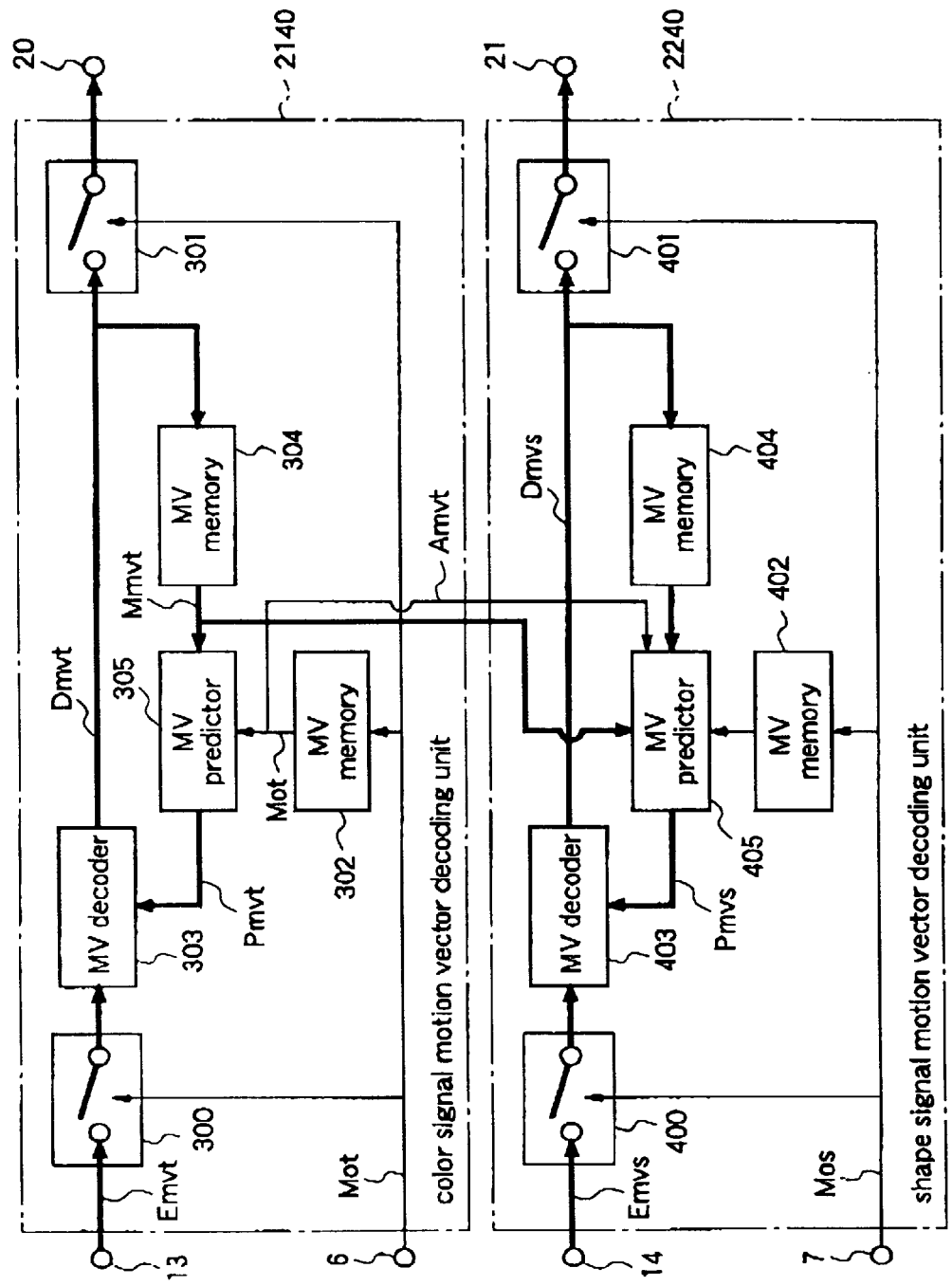
FIG. 14 is a block diagram showing a prior art motion vector decoding unit.

The shape motion vector decoding unit 2241 includes the MV predictor 405*a* which adaptively selects one of frame-basis color motion vector stored in the frame MV memory 304*a* and the frame-basis color motion vector output from the frame MV converter 310*b* and generates the prediction value of the shape motion vector of the target macroblock with reference to the selected color motion vector, which has replaced the MV predictor 405 included in the prior art shape motion vector decoding unit 2240 shown in FIG. 14.

When the MV predictor 405*a* generates the prediction value of the shape motion vector MVs0 of the target macroblock MBs0 in FIG. 12(*d*), reference macroblocks in the image space (shape image space) obtained from the shape signal, i.e., macroblocks RMBs1–RMBs3 adjacent to the target macroblock MBs0 are selected. As the reference motion vectors to be referred to, motion vectors MVs1–MVs3 of the macroblock RMBs1–RMBs3 are used. On the other hand, in the image space (color image space) obtained from the color signal, the reference macroblocks adjacent to the macroblock MB0 corresponding to the target macroblock MBs0 are not always the macroblock which have been subjected to the frame-by-frame motion compensation process. Therefore, when the reference macroblock is the macroblock which has been subjected to the frame-by-frame motion compensation process, the motion vectors stored in the frame MV memory 304*a* are referred to, while the reference macroblock is the macroblock which has been subjected to the field-by-field motion compensation process, the frame-basis motion vector resulting from converting the field-basis motion vectors stored in the field MV memory 304*b* into the frame-basis motion vector by the frame MV converter 310*b* is referred to.

It is decided whether or not each of the motion vectors MVt1, MVt2, and MVt3 of the reference blocks in the color image space is the coded motion vector, that is, each of the reference macroblocks is the inter-macroblock which has been inter-frame coded, according to a motion vector effectiveness signal Mmot output from the MV memory 402.

As for the macroblocks RMBs1–RMBs3 adjacent to the target macroblock MBs0 in the shape image space corresponding to the intra-macroblocks or the macroblocks outside the object, the corresponding motion vectors are not referred to in the process for generating the prediction value of the motion vector. Likewise, as for the blocks RB1–RB3 adjacent to the target macroblock MB0 in the color image space corresponding to the intra-macroblocks or the macroblocks outside the object, the corresponding motion vectors are not referred to in the process for generating the prediction value of the motion vector, either, subsequently, operation of effects will be described.

The operation of the image decoding apparatus differs from that of the prior art image decoding apparatus 2000 only in the operation of the motion vector decoding unit 2041 and the operation of the motion vector coding unit 2041 differs from the prior art motion vector decoding unit in the operation of the shape motion vector decoding unit 2241. Therefore, the color motion vector decoding unit 2141 is identical to the prior art color motion vector decoding unit 2140.

The MV predictor 405 included in the prior art shape motion vector decoding unit 2240 shown in FIG. 14 refers to the motion vectors MVt1, MVt2, and MVt3 stored in the MV memory 304 as the color motion vectors when it generates the prediction value of the shape motion vector of the target macroblock.

On the other hand, since in the color decoding section for the interlaced color signal, switching between the frame-by-frame motion vector compensation decoding process and the field-by-field motion compensation decoding process is adaptively performed, two types of motion vectors (field-basis and frame-basis motion vectors) are generated.

In this case, the shape motion vector to be referred to by the MV predictor 405 is the frame-basis motion vector, and therefore the MV predictor 405 cannot refer to the field-basis color motion vector.

The MV predictor 405*a* included in the shape motion vector decoding unit 2241 of the second embodiment, generates the prediction value of the shape motion vector of the target macroblock in the shape image space with reference to the motion vectors stored in the frame MV memory 304a included in the color motion vector decoding unit 2141 when the reference macroblock in the color image space has been subjected to the frame-by-frame motion compensation process. On the other hand, when the reference macroblock has been subjected to the field-by-field motion compensation process, the MV predictor 405a refers to the frame-basis motion vector obtained by converting the field-basis motion vectors stored in the field MV memory 304b in the color motion vector decoding unit 2141 by the use of the frame MV converter 310b.

Therefore, the MV predictor 405a included in the shape motion vector decoding unit 2241 always refers to the frame-basis motion vector, regardless of whether the reference macroblock is the macroblock which has been subjected to the field-by-field motion compensation process or the frame-by-frame motion compensation process.

In this manner, the motion vector decoding unit 2041 included in the image decoding apparatus which performs the motion compensation decoding process for the interlaced image signal, generates the prediction value of the shape motion vector of the target macroblock in the shape image space with reference to the color motion vector of the macroblock in the color image space, like the prior art motion vector decoding unit included in the image decoding apparatus which performs the motion compensation decoding process for the non-interlaced image signal.

Thus, in accordance with the second embodiment, the image decoding apparatus which adaptively performs switching between the frame-by-frame motion compensation decoding process and the field-by-field motion compensation decoding process, includes the MV predictor 405a which generates the prediction value of the shape motion vector with reference to the color motion vectors, i.e., the output of the frame MV converter 310b which converts the field-basis color motion vectors into the frame-basis motion vector when the reference color motion vector corresponds to the motion vector which has been subjected to the field-by-field motion compensation decoding process Therefore, in the process for predicting the shape motion vector performed by the shape decoding section which always performs the frame-by-frame motion compensation coding process, the color motion vectors of the interlaced color signal are referred to.

For the above reason, the construction of the shape motion vector decoding unit is made identical to that of the color motion vector decoding unit. To be specific, without the need for the motion vector decoding means for the frame-basis motion vectors and the field-basis motion vectors and by altering the construction of the MV predictor included in the prior art shape motion vector decoding unit, the simplified circuit construction of the shape motion vector decoding unit which generates the shape motion vector with reference to the color motion vector in the process for decoding the coded signal of the shape motion vector, can be realized, for the image decoding apparatus which performs the motion compensation decoding process for the interlaced image signal corresponding to the object.

In the second embodiment, the description has been given without distinguishing between the case where the reference macroblock in the color image space has one motion vector and the case where it has four motion vectors, because the motion vectors to-be-referred to are the same in either case.

To be more detailed, when the reference macroblock has one motion vector, it is assumed that the four motion vectors of the four blocks composing the macroblock are equivalent. Hence, in either case, for the target macroblock MBs0 (see FIG. 12(d)) in the shape image space, motion vectors MVt1–MVt3 of the blocks RB1–RB3 adjacent to the target macroblock MB0 (see FIG. 12(c)) in the color image space are used.

Embodiment 3

Figure 3:
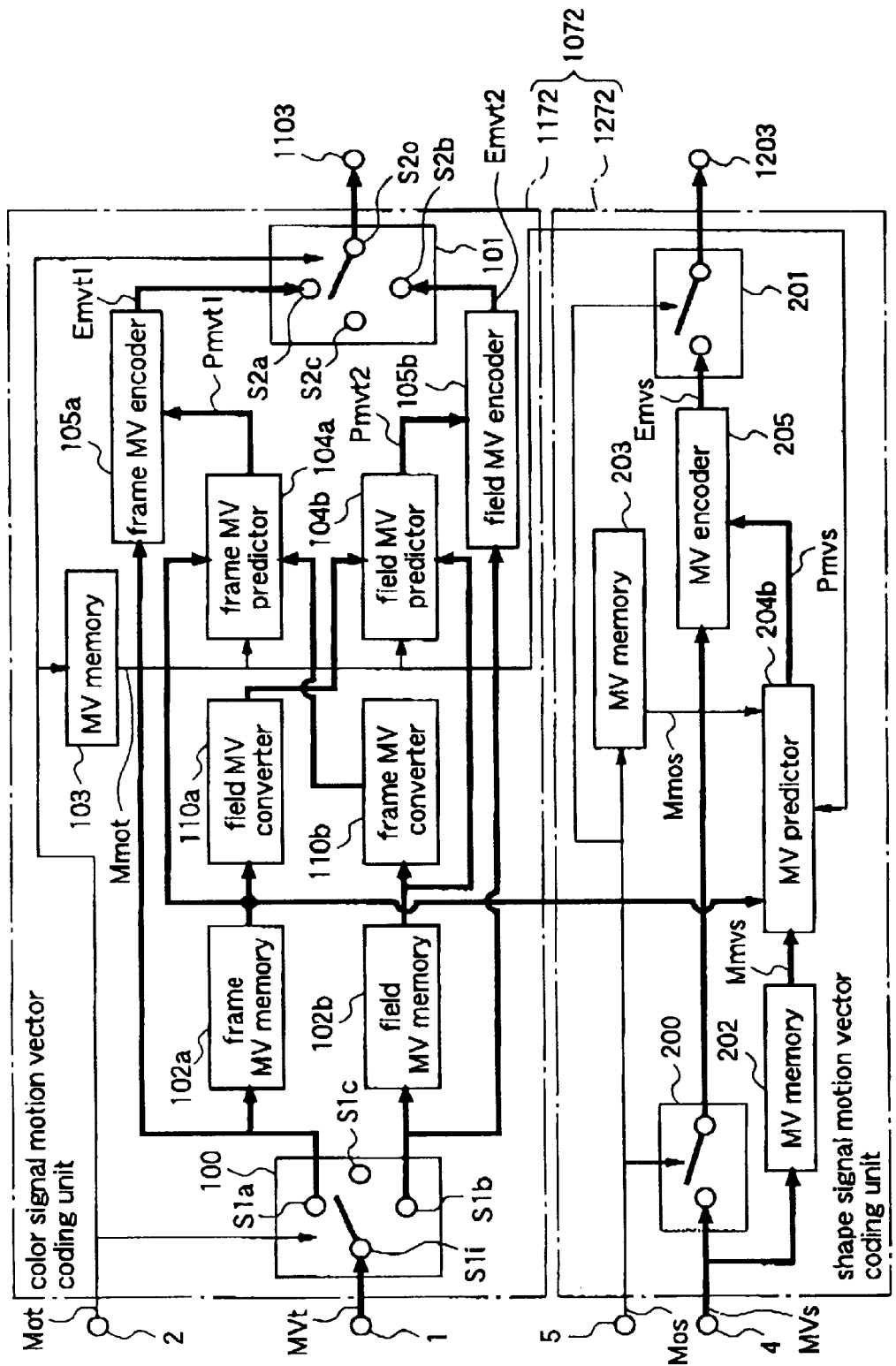
FIG. 3 is a block diagram showing an image coding apparatus according to a third embodiment of the present invention, wherein a motion vector coding unit included in the image coding apparatus is shown.

FIG. 3 is a block diagram showing a motion vector coding unit included in an image coding apparatus according to a third embodiment of the present invention.

A motion vector coding unit 1072 of the third embodiment comprises a color motion vector coding unit 1172 included in the color coding section and a shape motion vector coding unit 1272 included in the shape coding section.

The construction of the color motion vector coding unit 1172 is identical to that of the color motion vector coding unit 1171 of the first embodiment. The shape motion vector coding unit 1272 includes an MV predictor 204b which generates the prediction value of the shape motion vector of the target macroblock with reference to the output of the MV memory 102a (frame-basis motion vector) included in the color motion vector coding unit 1172, which has replaced the MV predictor 204a included in the shape motion vector coding unit 1271 of the first embodiment, and the other construction is identical to that of the shape motion vector coding unit 1271 of the first embodiment.

When the MV predictor 204b generates the prediction value of the shape motion vector MVs0 of the target macroblock MBs0 shown in FIG. 12(d), reference macroblocks in the image space (shape image space) obtained from the shape signal, i.e., macroblocks RMBs1–RMBs3 adjacent to the target macroblock MBs0 are selected. As the motion vectors to-be-referred, the motion vectors MVs1–MVs3 of the macroblock RMBs1–RMBs3 are used. On the other hand, in the image space (color image space) obtained from the color signal, the reference macroblocks adjacent to the macroblock MB0 corresponding to the target macroblock MBs0 not always the macroblocks which have been subjected to the frame-by-frame motion compensation process. Therefore, when the reference macroblock is the macroblock which has bee subjected to the frame-by-frame motion compensation process, the motion vectors stored in the frame MV memory 102a are referred to, while when the reference macroblock is the macroblock which has been subjected to the field-by-field motion compensation process, the color motion vector is not referred to. The other construction of the MV predictor 204b is almost identical to that of the MV predictor 204a of the first embodiment.

Subsequently, operation and effects will be described.

Unlike the motion vector coding unit 1071 of the first embodiment, in the motion vector coding unit 1272, the output of the frame MV converter 110b included in the color motion vector coding unit 1172 is not sent to the shape motion vector coding unit 1272.

In the shape motion vector coding unit 1272, the MV predictor 204b generates the prediction value of the shape motion vector of the target macroblock in the shape image space, with reference to the corresponding motion vectors stored in the frame MV memory 102a, when the reference macroblock in the color image space has been subjected to the frame-by-frame motion compensation process. On the other hand, when the reference macroblock has been subjected to the field-by-field motion compensation process, the MV predictor 204b does not refer to the output (frame-basis motion vector) of the frame MV converter 110b included in the color motion compensation coding unit 1171, unlike in the MV predictor 204a of the first embodiment.

Since the motion vector coding unit 1072 of the third embodiment does not refer to the field-basis color motion vector, precision in predicting the prediction value of the shape motion vector of the target macroblock might be reduced in contrast with the motion vector coding unit 1071 (see FIG. 1).

When the target macroblock has been subjected to the frame-by-frame motion compensation process and the reference macroblock has been subjected to the field-by-field motion compensation process, the output of the frame MV converter 110*b* included in the color motion vector coding unit 1172 is referred to by the frame MV predictor 104*a*, and therefore the motion vector coding unit of the first embodiment is more appropriate.

In this case, the frame MV predictor 104*a* needs to refer to the field-basis motion vector, and hence, the frame MV converter 110*b* converts the field-basis motion vectors into the frame-basis motion vector. So, the amount of data to be processed by the frame Mv converter 110*b* is the same regardless of whether the output (frame-basis motion vector) of the frame MV converter 110*b* is sent to the frame MV predictor 104*a* and the MV predictor 204*b* or to the frame MV predictor 104*a*. From the view point of the precision in predicting the prediction value of the shape motion vector, the motion vector coding unit of the first is more suitable.

When the target macroblock and the reference macroblock in the color image space have been subjected to the field-by-field motion compensation, the color motion vector coding unit 1172 refers to the output of the field MV memory 102*b*. Therefore, using the construction of the motion vector coding unit 1071 of the first embodiment which refers to the color motion vector of the reference macroblock which has been subjected to the field-by-field shape motion compensation process when the shape motion vector is predicted, the frame MV converter 110*b* needs to convert the field-basis color motion vectors to the frame-basis color motion vector only for the prediction process for the shape motion vector.

On the other hand, in the motion vector coding unit 1072 of the third embodiment, only the output of the frame memory 102*a* included in the color coding section 1172 is supplied to the MV predictor 204*b* included in the shape motion vector coding unit 1272.

In such construction, when the target macroblock and the reference macroblock in the color image space have been subjected to the field-by-field motion compensation process, in the shape motion vector coding unit 1272 predicts the shape motion vector without reference to the color motion vector of the reference macroblock, and thereby the frame MV converter 110*b* included in the color motion vector coding unit 1172 can omit the process for converting the field-basis color motion vectors into the frame-basis color motion vector.

Embodiment 4

Figure 4:
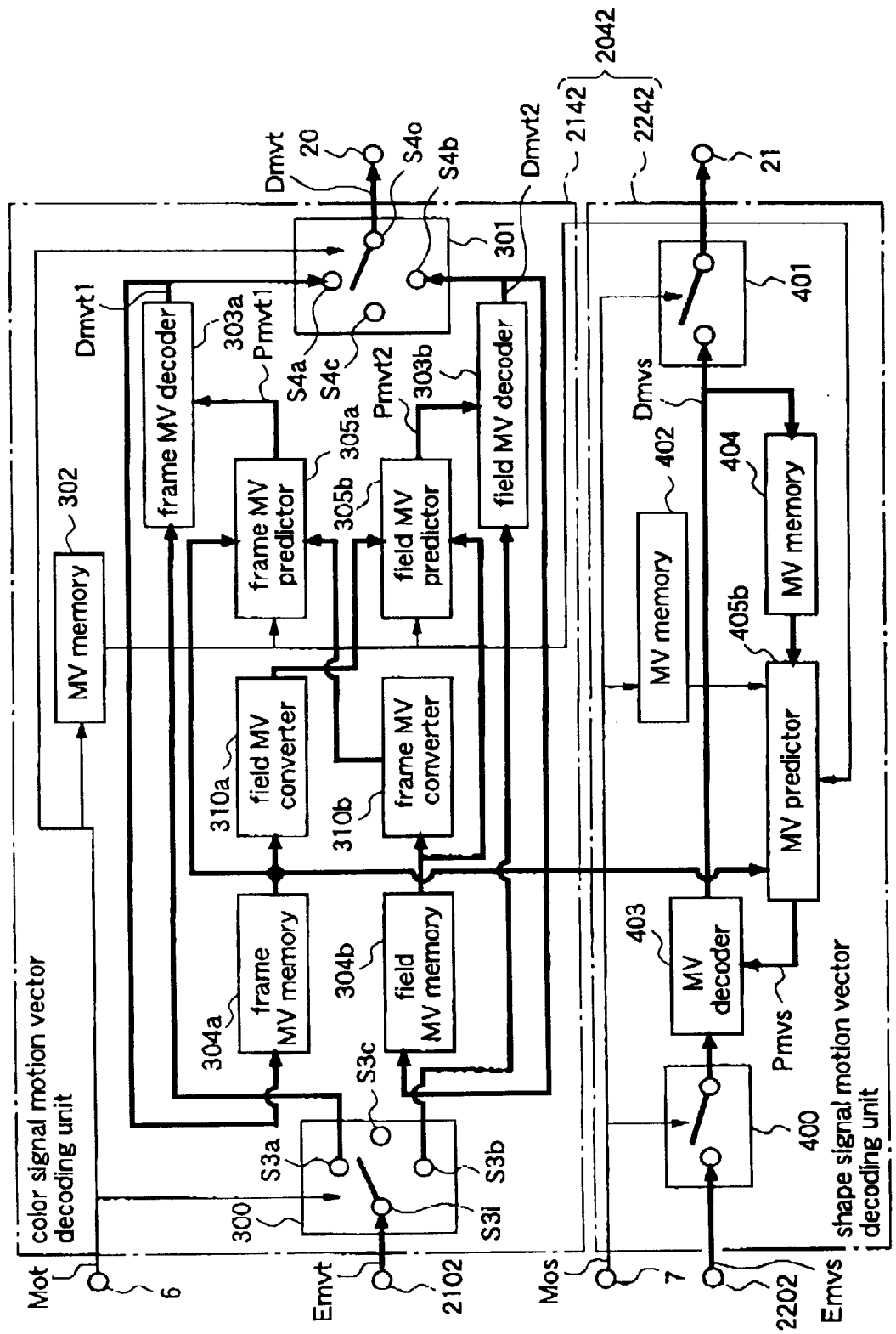
FIG. 4 is a block diagram showing an image decoding apparatus according to a fourth embodiment of the present invention, wherein a motion vector decoding unit included in the image decoding apparatus is shown.

FIG. 4 is a block diagram showing a motion vector decoding unit included in an image decoding apparatus according to a fourth embodiment of the present invention.

The motion vector decoding unit 2042 of the fourth embodiment is adapted to the motion vector coding unit 1072 of the third embodiment shown in FIG. 3. The motion vector decoding unit 2042 includes a color motion vector decoding unit 2142 which decodes the coded signal Emvt of the color motion vector sent from the color motion vector coding unit 1172 and outputs the resulting decoded signal Dmvt and a shape motion vector decoding unit 2242 which decodes the coded signal Emvs of the shape motion vector sent from the shape motion vector coding unit 1272 included in the motion vector coding unit 1072 and outputs the resulting decoded shape signal Dmvs.

The construction of the color motion vector decoding unit 2142 is identical to that of the color motion vector decoding unit 2141 of the second embodiment. The shape motion vector decoding unit 2242 includes an MV predictor 405*b* which generates the prediction value of the shape motion vector of the target macroblock with reference to the output of a frame MV memory 304*a* (frame-basis motion vector) included in the color motion vector decoding unit 2142, which has replaced the MV predictor 405*a* included in the shape motion vector decoding unit 2242 of the second embodiment. The other construction is identical to that of the shape motion vector decoding unit 2141.

When the MV predictor 405*a* generates the prediction value of the shape motion vector MVs0 of the target macroblock MBs0 shown in FIG. 12(*d*), reference macroblocks in the image space (shape image space) obtained from the shape signal, i.e., macroblocks RMBs1–RMBs3 adjacent to the target macroblock MBs are selected. As the motion vectors to be referred to, motion vectors Mv1–MVs3 of the macroblock RMBs1–RMBs3 are used. On the other hand, in the image space (color image space) obtained from the color signal, the reference macroblocks adjacent to the macroblock MB0 corresponding to the target macroblock MBs0 are not always the macroblock which have been subjected to the frame-by-frame motion compensation coding process. Therefore, when the reference macroblock is the macroblock which has bee subjected to the frame-by-frame motion compensation process, the motion vectors stored in the frame MV memory 304*a* are referred to, while the reference macroblock is the macroblock which has been subjected to the field-by-field motion compensation process, the color motion vector is not referred to. The other construction of the MV predictor 405*b* is identical to that of the MV predictor 405*a* of the second embodiment.

Subsequently, operation and effects will be described.

In the motion vector coding unit 2042 of the fourth embodiment, unlike the motion vector decoding unit 2041 of the second embodiment, the output of the frame MV converter 310*b* included in the color motion vector decoding unit 2142 (frame-basis motion vector) is not sent to the shape motion vector decoding unit 2242.

In the shape motion vector decoding unit 2242, the MV predictor 405*b* generates the prediction value of the shape motion vector of the target macroblock in the shape image space with reference to the corresponding motion vector stored in the frame MV memory 304*a* when the reference macroblock in the color image space has been subjected to the frame-by-frame motion compensation process. On the other hand, when the reference macroblock has been subjected to the field-by-field motion compensation process, the MV predictor 405*b* does not refer to the output (frame-basis motion vector) of the frame MV converter 310*b* included in the color motion compensation decoding unit 2142.

Since the motion vector decoding unit 2042 of the fourth embodiment does not refer to the field-basis color motion vector, precision in predicting the prediction value of the shape motion vector of the target macroblock might be reduced in contrast with the motion vector decoding unit 2041 (see FIG. 2).

When the target macroblock has been subjected to the frame-by-frame motion compensation process and the reference macroblock has been subjected to the field-by-field motion compensation process, the output of the frame MV converter 310*b* included in the color motion vector decoding unit 2142 is referred to by the frame MV predictor 305*a* included in the color motion vector decoding unit 2142, the motion vector decoding unit of the second embodiment is more appropriate.

In this case, the frame Mv predictor 305a included in the color motion vector coding unit 2142 needs to refer to the field-basis motion vector, and hence, the frame MV converter 310b converts the field-basis motion vectors into the frame-basis motion vector. So, the amount of data to be processed by the frame MV converter 310b is the same regardless of whether the output (frame-basis motion vector) of the frame MV converter 310b is output to the frame MV predictor 305a and the MV predictor 405b or to the frame MV predictor 305a. From the view point of the precision in predicting the prediction value of the shape motion vector, the motion vector decoding unit of the second embodiment is more suitable.

When the target macroblock and the reference macroblock in the color image space have been subjected to the field-by-field motion compensation, the color motion vector decoding unit 2142 refers to the output of the field MV memory 304b. Therefore, using the construction of the motion vector decoding unit 2041 of the second embodiment which refers to the color motion vector of the reference macroblock which has been subjected to the field-by-field shape motion compensation process when the shape motion vector is predicted, the frame MV converter 310b needs to convert the field-basis color motion vectors to the frame-basis color motion vector only for the prediction process for the shape motion vector.

On the other hand, in the motion vector decoding unit 2042 of the fourth embodiment, only the output of the frame MV memory 304a included in the color decoding section 2142 is supplied to the MV predictor 405b included in the shape motion vector decoding unit 2242.

In such construction, when the target macroblock and the reference macroblock in the color image space have been subjected to the field-by-field motion compensation process, the shape motion vector decoding unit 2242 predicts the shape motion vector without reference to the motion vector of the reference macroblock, and thereby the frame MV converter 310b included in the color motion vector decoding unit 2142 can omit the process for converting the field-basis color motion vectors into the frame-basis color motion vector.

Embodiment 5

Figure 5:
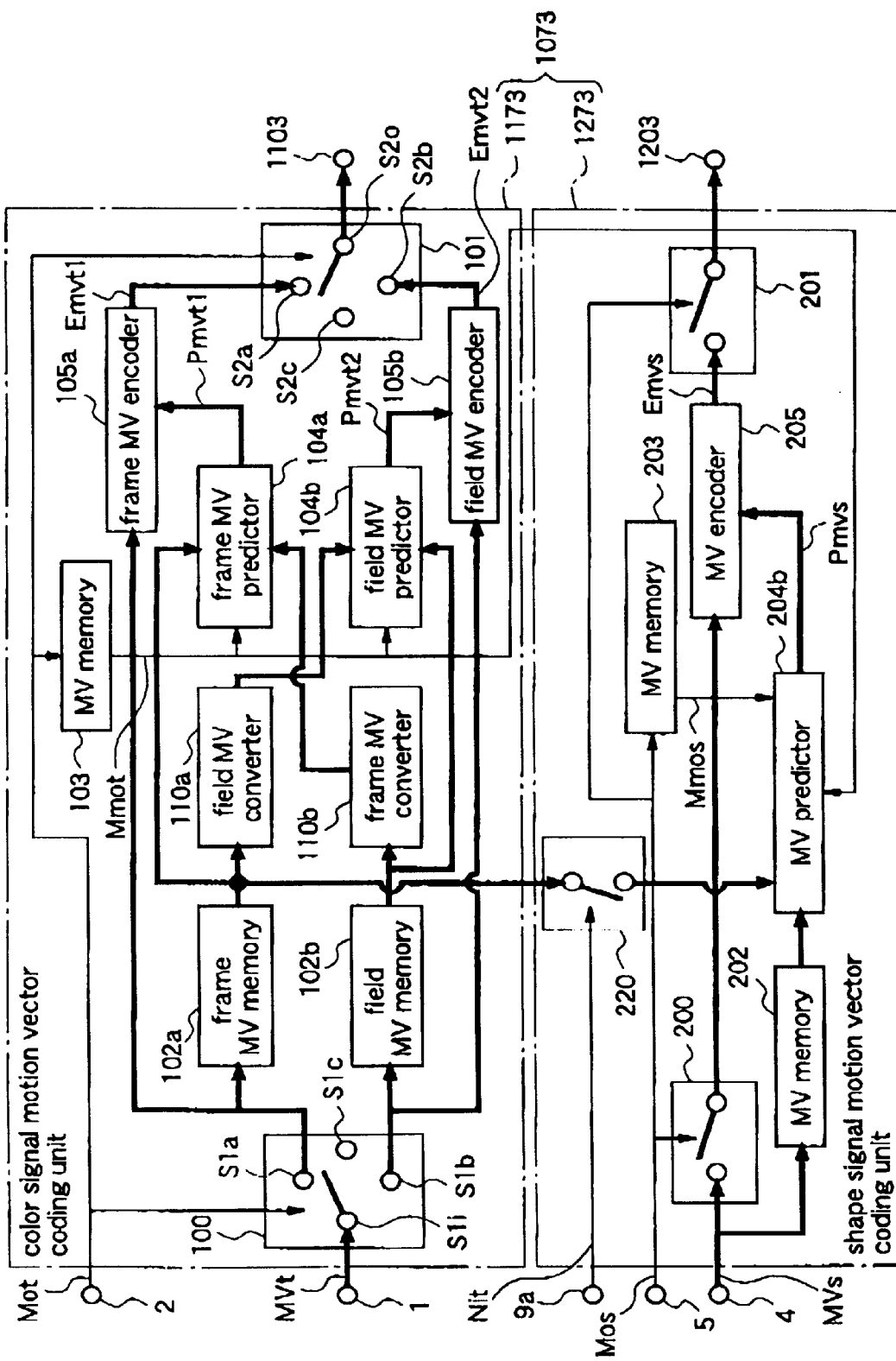
FIG. 5 is a block diagram showing an image coding apparatus according to a fifth embodiment of the present invention, wherein a motion vector coding unit included in the image coding apparatus is shown.

FIG. 5 is a block diagram showing a motion vector coding unit included in an image coding apparatus according to a fifth embodiment of the present invention.

A motion vector coding unit 1073 of the fifth embodiment comprises a color motion vector coding unit 1173 included in the color coding section and a shape motion vector coding unit 1273 included in the shape coding section, like the motion vector coding unit 1073 of the third embodiment.

The construction to the color motion vector coding unit 1173 is identical to that of the color motion vector coding unit 1172 of the third embodiment. The shape motion vector coding unit 1273 includes a switch 220 provided between a frame MV memory 102a included in the color motion vector coding unit 1173 and an MV predictor 204b for performing control according to a non-interlacing decision signal Nit externally supplied in order to decide whether or not the output of the frame MV memory 102a (frame-basis motion vector) is to be supplied to the MV predictor 204b. The other construction of the shape motion vector coding unit 1273 of the fifth embodiment is identical to that of the shape motion vector coding unit 1272 of the third embodiment. The non-interlacing decision signal Nit indicates whether an image signal input to the image coding apparatus is the interlaced signal or the non-interlaced signal.

Subsequently, operation and effects will be described.

When the image signal is the non-interlaced signal, the switch 220 enters into the ON-state according to the non-interlacing decision signal Nit input to an input terminal 9a. Thereby, an MV predictor 204b can refer to the frame-basis motion vector stored in the frame MV memory 102a included in the color motion vector coding unit 1173.

In other words, when the non-interlaced image signal is input, the motion vector coding unit 1073 of the fifth embodiment operates as in the case of the prior art motion vector coding unit shown in FIG. 13, and the same coding efficiency is realized.

On the other hand, when the image signal is the interlaced image signal, the switch 220 enters into the OFF-state according to the non-interlacing decision signal Nit. Thereby, the MV predictor 204b cannot refer to the color motion vector in the prediction process.

As a result, in this fifth embodiment, in the process for coding the interlaced image signal, the MV predictor 204b need not decide whether the motion vector of the reference macroblock is the field-basis motion vector or the frame-basis motion vector, and therefore can reduce amount of signal processing for this decision process, although efficiency in coding the shape motion vector is reduced.

Embodiment 6

Figure 6:
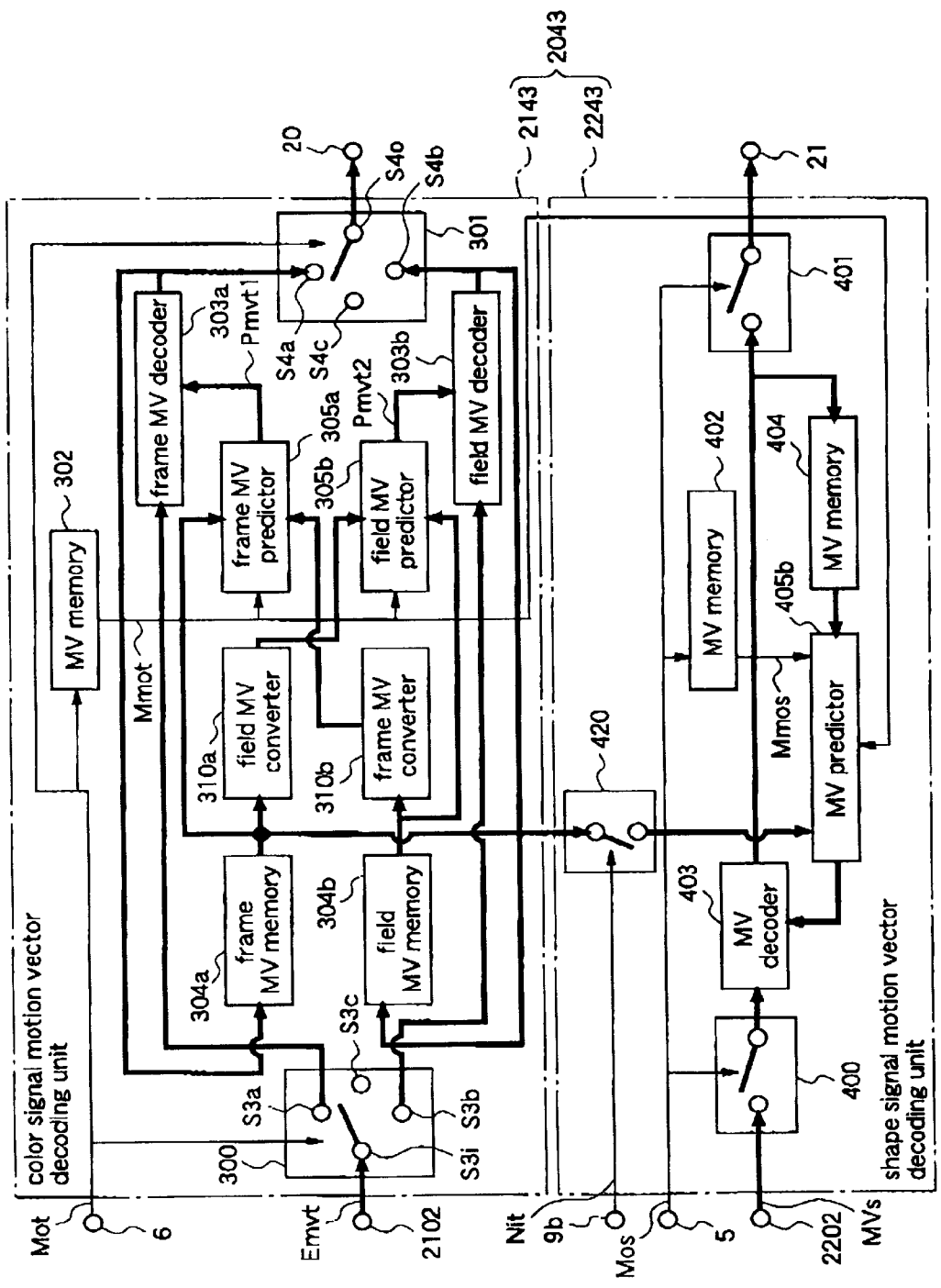
FIG. 6 is a block diagram showing an image decoding apparatus according to a sixth embodiment of the present invention, wherein a motion vector decoding unit included in the image decoding apparatus is shown.

FIG. 6 is a block diagram showing a motion vector decoding unit included in an image decoding apparatus according to a sixth embodiment of the present invention.

A motion vector decoding unit 2043 of the sixth embodiment is adapted to the motion vector coding unit 1073 of the fifth embodiment shown in FIG. 5. The motion vector decoding unit 2043 includes a color motion vector decoding unit 2143 which decodes the coded signal Emvt of the color motion vector output from the color motion vector coding unit 1173 included in the motion vector coding unit 1073 and outputs the resulting decoded signal Dmvt, and a shape motion vector decoding unit 2243 which decodes the coded signal Emvs of the shape motion vector output from the shape motion vector coding unit 1273 included in the motion vector coding unit 1073.

The construction of the color motion vector decoding unit 2143 is identical to that of the color motion vector decoding unit 2142 of the fourth embodiment. The shape motion vector decoding unit 2243 includes a switch 420 provided between the frame MV memory 304a included in the color motion vector decoding unit 2143 and an MV predictor 405b for performing control according to a non-interlacing decision signal Nit externally supplied in order to decide whether or not the output of the frame memory MV memory 304 (frame-basis motion vector) i& to be supplied to the MV predictor 405b. The other construction of the shape motion vector decoding unit 2243 of the sixth embodiment is identical to that of the shape motion vector decoding unit 2242 of the fourth embodiment.

The non-interlacing decision signal Nit indicates whether or not the coded image signal input to the image decoding apparatus is the non-interlaced coded image signal.

Subsequently, operation and effects will be described.

When the non-interlaced coded image signal is input to the image decoding apparatus, according to the non-interlacing decision signal Nit input to an input terminal 9b, the switch 420 enters into the ON-state. Thereby, the MV predictor 405b can refer to the frame-basis motion vector stored in the frame MV memory 304a included in the color motion vector decoding unit 2143.

When the non-interlaced image signal is input, the motion vector decoding unit 2043 of the sixth embodiment operates as in the case of the prior art motion vector decoding unit shown in FIG. 14, and the same decoding efficiency is realized.

On the other hand, when the image signal is the interlaced image signal, the switch 420 enters into the OFF-state according to the non-interlacing decision signal Nit. Thereby, the MV predictor 405b cannot refer to the color motion vector in the prediction process.

As a result, in this sixth embodiment, in the process for decoding the interlaced image signal, the MV predictor 405b need not decide whether the motion vector of the reference macroblock is the field-basis motion vector or the frame-basis motion vector, and therefore can reduce amount of signal processing for this decision process, although efficiency in decoding the shape motion vector is reduced.

Furthermore, when a coding or decoding program for realizing construction of the motion vector coding unit or the motion vector decoding unit according to any of the above-described embodiments by software is recorded in a data storage medium such as a floppy disk, the image processing can be easily implemented in an independent computer system.

Figure 7:
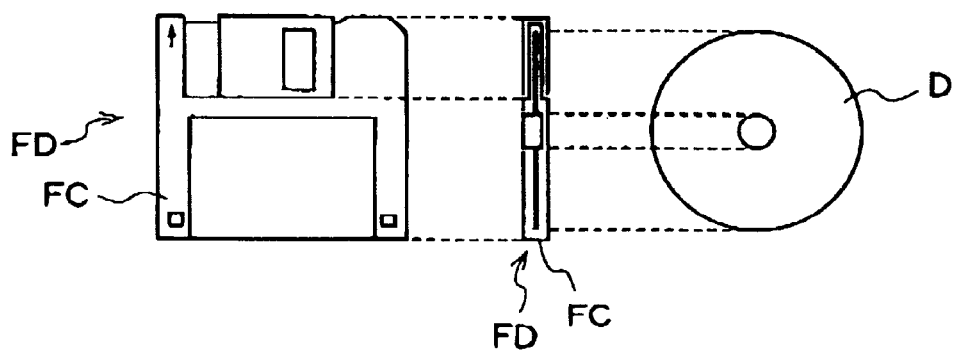
FIGS. 7(a)–7(b) are diagrams for explaining a data storage medium which stores a program for performing the motion vector coding process or the motion vector decoding process according to the above embodiment.
FIG. 7(c) is a diagram for explaining the computer system which performs the motion vector coding process and the motion vector decoding system.
Figure 7:
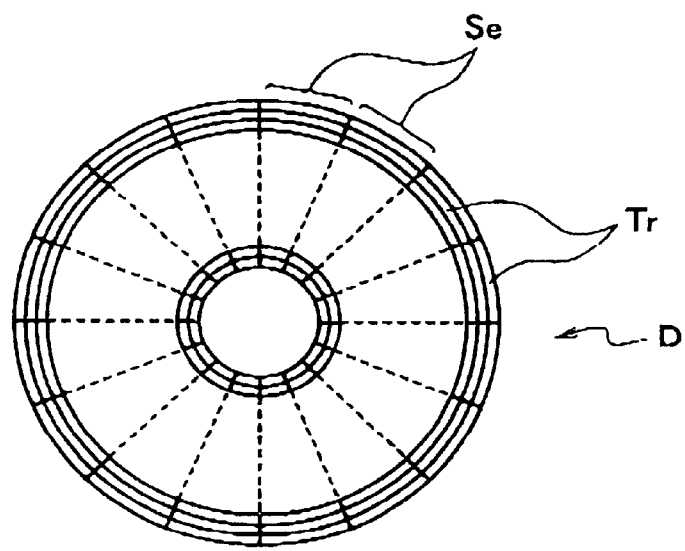
Figure 7:
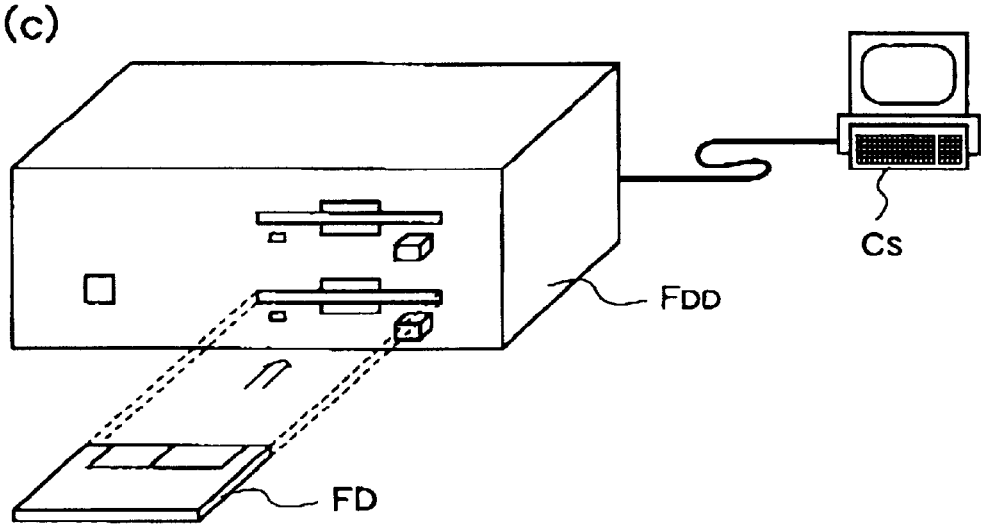
Figure 8:
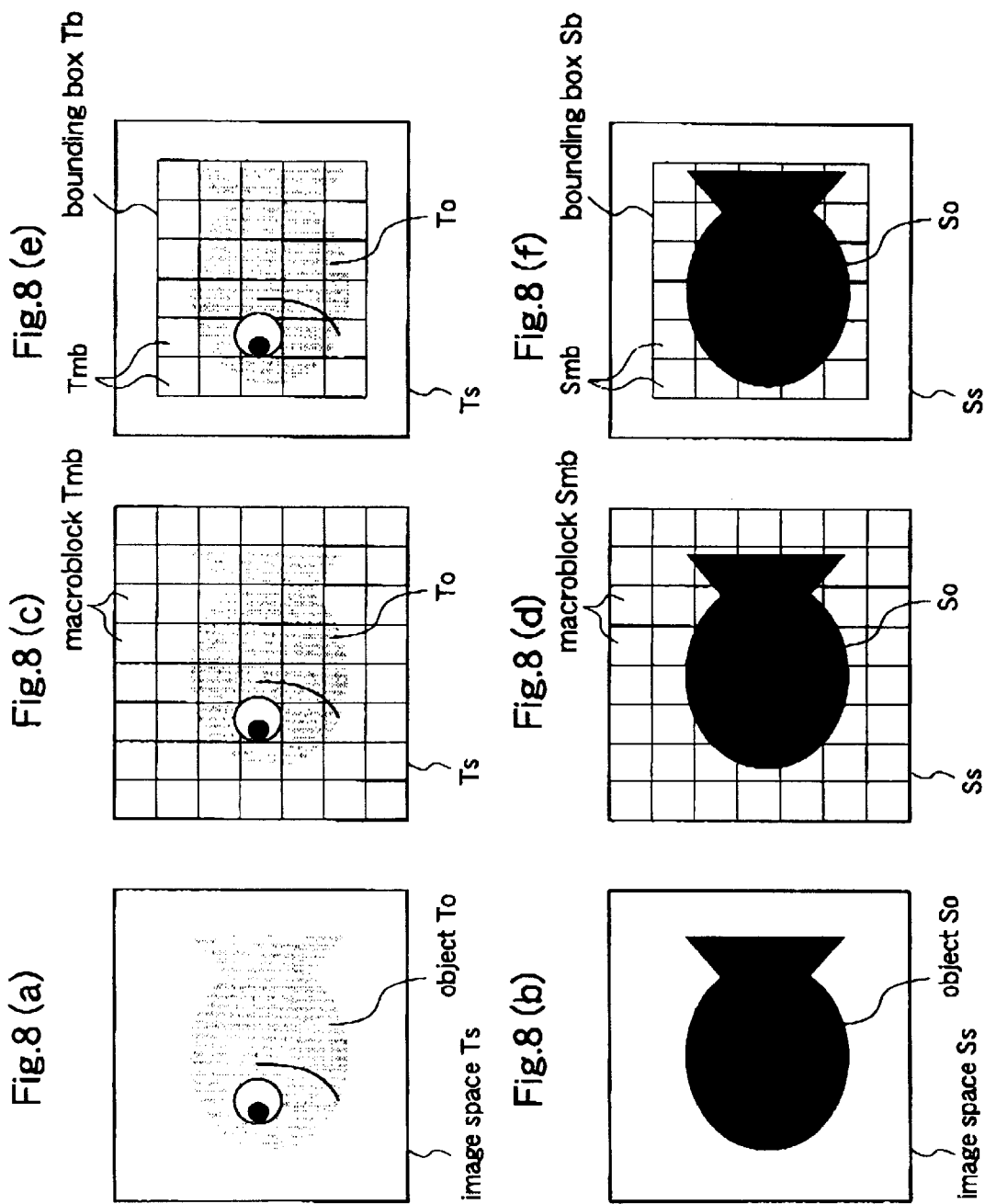

FIGS. 7(a)–7(c) are diagrams for explaining the case where the motion vector coding unit of the first, third, or fifth embodiment or the motion vector decoding unit of the second, fourth, or sixth embodiment is executed by a computer system, using a floppy disk which contains the image coding or decoding program.

FIG. 7(a) shows a front view of a floppy disk FD, a cross-sectional view thereof, and a floppy disk body D. FIG. 7(b) shows an example of a physical format of the floppy disk body D.

The floppy disk FD has the configuration in which a floppy disk case FC contains the floppy disk body D. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk FD having the above-mentioned program, data of the program are recorded in the assigned sectors on the floppy disk body D.

FIG. 7(c) illustrates the structure for recording the program in the floppy disk FD and performing the image processing by software using the program stored in the floppy disk FD.

To be specific, when the program is recorded in the floppy disk FD, data of the program are written in the floppy disk FD from the computer system Cs through the floppy disk drive FDD. When the above-described image coding apparatus or image decoding apparatus is constructed in the computer system Cs by the program recorded in the floppy disk FD, the program is read from the floppy disk FD by the floppy disk drive FDD and then loaded to the computer system Cs.

While in the above description a floppy disk is employed as a data storage medium, an optical disk may be employed. Also in this case, coding or decoding by software can be performed in like manner as the case of using the floppy disk. Further, the data storage medium is not restricted to these disks. Any medium may be employed as long as it can contain the program, for example, an IC card, ROM cassette, etc. Also in the case of using these data storage media, image processing by software can be performed in like manner as the case of using the floppy disk.

What is claimed is:

1. An image coding apparatus which receives an interlaced image signal comprising a color signal for color display of an object and a shape signal indicating a shape of the object and corresponding to the object included in an image space as an input and is operable to perform an adaptive coding process including a frame-by-frame motion compensation coding process and a field-by-field motion compensation coding process for the image signal in macroblock units each comprising a predetermined number of pixels into which the image space is divided, said apparatus comprising:

a color motion vector coding unit operable to code either a frame-basis color motion vector or a field-basis color motion vector of a target macroblock to be coded which is used in either the frame-by-frame motion compensation coding process or the field-by-field motion compensation coding process for an interlaced color signal, based on its prediction value; and a shape motion vector coding unit operable to code a frame-basis shape motion vector of the target macroblock which is used in the frame-by-frame motion compensation coding process for an interlaced shape signal, based on a prediction value obtained from a color motion vector and a shape motion vector of a coded macroblock; wherein said color motion vector coding unit includes a motion vector conversion device operable to convert field-basis color motion vectors of the coded macroblock into a frame-basis color motion vector of the coded macroblock; and said shape motion vector coding unit includes a shape motion vector predictor operable to generate the prediction value of the shape motion vector of the target macroblock based on the frame-basis shape motion vector of the coded macroblock and the frame-basis color motion vector of the coded macroblock output from said motion vector conversion device when the color motion vector of the coded macroblock is the field-basis motion vector.

2. An image coding apparatus which receives an interlaced image signal comprising a color signal for color display of an object and a shape signal indicating a shape of the object and corresponding to the object included in an image space as an input and is operable to perform an adaptive coding process including a frame-by-frame motion compensation coding process and a field-by-field motion compensation coding process for the image signal in macroblock units each comprising a predetermined number of pixels into which the image space is divided, said apparatus comprising:

a color motion vector coding unit operable to code either a frame-basis color motion vector or a field-basis color motion vector of a target macroblock to be coded which is used in either the frame-by-frame motion compensation coding process or the field-by-field motion compensation coding process for an interlaced color signal, based on its prediction value; and a shape motion vector coding unit operable to code a frame-basis shape motion vector of the target macroblock which is used in the frame-by-frame motion compensation coding process for an interlaced shape signal, based on its prediction value; wherein the shape motion vector coding unit includes a shape motion predictor which is operable to generate the prediction value of the shape motion vector of the target macroblock based on a color motion vector and a shape motion vector of a coded macroblock when the color motion vector of the coded macroblock is the frame-basis motion vector, and generate the prediction value of the shape motion vector of the target macroblock based on a frame-basis shape motion vector of the coded macroblock when the color motion vector of the coded macroblock is the field-basis motion vector.

3. An image coding apparatus which receives either an interlaced image signal or a non-interlaced image signal comprising a color signal for color display of an object and a shape signal indicating a shape of the object and corresponding to the object included in an image space as an input and is operable to perform an adaptive coding process including a frame-by-frame motion compensation coding process and a field-by-field motion compensation coding process for the image signal in macroblock units each comprising a predetermined number of pixels into which the image space is divided, said apparatus comprising:

a color motion vector coding unit operable to code either a frame-basis color motion vector or a field-basis color motion vector of a target macroblock to be coded which is used in either a frame-by-frame motion compensation coding process or a field-by-field motion compensation coding process for a color signal, based on its prediction value; and a shape motion vector coding unit operable to code a frame-basis shape motion vector of the target macroblock which is used in the frame-by-frame motion compensation coding process for a non-interlaced shape signal, based on its prediction value; wherein said shape motion vector coding unit includes a shape motion vector predictor operable to generate the prediction value of the shape motion vector of the target macroblock based on a color motion vector and a shape motion vector of a coded macroblock when the non-interlaced image signal is received as the image signal, and generate the prediction value of the shape motion vector of the target macroblock based on a frame-basis shape motion vector of the coded macroblock when the interlaced image signal is received as the image signal.

4. An image decoding apparatus which receives a coded image signal corresponding to an interlaced image signal comprising a color signal for color display of an object and a shape signal indicating a shape of the object and corresponding to the object included in an image space as an input and is operable to perform an adaptive decoding process including a frame-by-frame motion compensation decoding process and a field-by-field motion compensation decoding process for the coded image signal in macroblock units each comprising a predetermined number of pixels into which the image space is divided, said apparatus comprising:

a color motion vector decoding unit operable to decode either a frame-basis color motion vector or a field-basis color motion vector of a target macroblock to be decoded which is used in either the frame-by-frame motion compensation decoding process or the field-by-field motion compensation decoding process for a coded signal of an interlaced color signal, based on its prediction value; and a shape motion vector decoding unit operable to decode a frame-basis shape motion vector of the target macroblock which is used in the frame-by-frame motion compensation decoding process for a coded signal of an interlaced shape signal, based on a prediction value obtained from a color motion vector and a shape motion vector of a decoded macroblock, wherein:

said color motion vector decoding unit includes a motion vector conversion device operable to convert field-basis color motion vectors of the decoded macroblock into a frame-basis color motion vector of the decoded macroblock; and said shape motion vector decoding unit includes a shape motion vector predictor operable to generate the prediction value of the shape motion vector of the target macroblock based on the frame-basis shape motion vector of the decoded macroblock and the frame-basis color motion vector of the decoded macroblock output from said motion vector conversion device when the color motion vector of the decoded macroblock is the field-basis motion vector.

5. An image decoding apparatus which receives a coded image signal corresponding to an interlaced image signal comprising a color signal for color display of an object and a shape signal indicating a shape of the object and corresponding to the object included in an image space as an input and is operable to perform an adaptive decoding process including a frame-by-frame motion compensation decoding process and a field-by-field motion compensation decoding process for the coded image signal in macroblock units each comprising a predetermined number of pixels into which the image space is divided, said apparatus comprising:

a color motion vector decoding unit operable to decode either a frame-basis color motion vector or a field-basis color motion vector of a target macroblock to be decoded which is used in either a frame-by-frame motion compensation decoding process or a field-by-field motion compensation decoding process for a coded signal of an interlaced color signal, based on its prediction value; and a shape motion vector decoding unit operable to decode a frame-basis shape motion vector of the target macroblock which is used in the frame-by-frame motion compensation decoding process for a coded signal of an interlaced shape signal, based on its prediction value, wherein:

said shape motion vector decoding unit includes a shape motion vector predictor operable to generate the prediction value of the shape motion vector of the target macroblock based on a color motion vector and a shape motion vector of a decoded macroblock when the color motion vector of the decoded macroblock is the frame-basis motion vector, and generate the prediction value of the shape motion vector of the target macroblock based on a frame-basis shape motion vector of the decoded macroblock when the color motion vector of the decoded macroblock is the field-basis motion vector.

6. An image decoding apparatus which receives a coded image signal corresponding to either an interlaced image signal or a non-interlaced image signal comprising a color signal for color display of an object and a shape signal indicating a shape of the object and corresponding to the object included in an image space as an input and is operable to perform an adaptive decoding process including a frame-by-frame motion compensation decoding process and a field-by-field motion compensation decoding process for the coded image signal in macroblock units each comprising a predetermined number of pixels into which the image space is divided, said apparatus comprising:

a color motion vector decoding unit operable to decode either a frame-basis color motion vector or a field-basis color motion vector of a target macroblock to be decoded which is used in either a frame-by-frame motion compensation decoding process or a field-by-field motion compensation decoding process for a coded signal of the color signal, based on its prediction value; and a shape motion vector decoding unit operable to decode a frame-basis shape motion vector of the target macroblock which is used in the frame-by-frame motion compensation decoding process for a coded signal of a non-interlaced shape signal, based on its prediction value, wherein:

said shape motion vector decoding unit includes a shape motion vector predictor operable to generate the prediction value of the shape motion vector of the target macroblock based on a color motion vector and a shape motion vector of a decoded macroblock when the coded image signal of the non-interlaced image signal is received as the coded image signal, and generate the prediction value of the shape motion vector of the target macroblock based on a frame-basis shape motion vector of the decoded macroblock when the coded image signal of the interlaced image signal is received as the coded image signal.

7. An image coding method for coding an interlaced image signal corresponding to an object included in an image space in macroblock units each comprising a predetermined number of pixels into which the image space is divided, by performing an adaptive coding process including a frame-by-frame motion compensation coding process and a field-by-field motion compensation coding process, said method comprising:

a shape motion vector coding for coding a shape motion vector which is used in a frame-by-frame motion compensation coding process for an interlaced shape signal indicating a shape of an object included in the image signal in macroblock units, based on its prediction value; and a color motion vector conversion for converting field-basis color motion vectors used in a field-by-field motion compensation coding process for an interlaced color signal for color display of an object included in the image signal into a frame-basis color motion vector, wherein:

in said shape motion vector coding, the prediction value of the shape motion vector of the target macroblock is generated with reference to a frame-basis color motion vector obtained by converting a color motion vector of a coded macroblock in said color motion vector conversion when the prediction value is generated with reference to the shape motion vector and the color motion vector of the coded macroblock and the color motion vector of the coded macroblock is the field-basis motion vector.

8. An image coding method for coding an interlaced image signal corresponding to an object included in an image space in macroblock units each comprising a predetermined number of pixels into which the image space is divided, by performing an adaptive coding process including a frame-by-frame motion compensation coding process and a field-by-field motion compensation coding process, said method comprising:

a color motion vector coding for coding either a frame-basis color motion vector or a field-basis color motion vector which is used in either a frame-by-frame motion compensation coding process or a field-by-field motion compensation coding process for an interlaced color signal for color display of the object included in the image signal in macroblock units, based on its prediction value; and a shape motion vector coding for coding a shape motion vector which is used in the frame-by-frame motion compensation coding process for an interlaced shape signal indicating a shape of the object included in the image signal in macroblock units, based on its prediction value, wherein the prediction value of the shape motion vector of a target macroblock to be coded is generated with reference to a shape motion vector and a color motion vector of a coded macroblock when the color motion vector of the coded macroblock is the frame-basis motion vector, and the prediction value of the shape motion vector of the coded macroblock is generated with reference to the shape motion vector of the coded macroblock when the color motion vector of the coded macroblock is the field-basis motion vector.

9. An image coding method for coding an interlaced image signal or a non-interlaced image signal corresponding to an object included in an image space in macroblock units each comprising a predetermined number of pixels into which the image space is divided, by performing an adaptive coding process including a frame-by-frame motion compensation coding process and a field-by-field motion compensation coding process, said method comprising:

a color motion vector coding for coding either a frame-basis color motion vector or a field-basis color motion vector which is used in either a frame-by-frame motion compensation coding process or a field-by-field motion compensation coding process for a color signal for color display of the object included in the image signal in macroblock units, based on its prediction value; and a shape motion vector coding for coding a shape motion vector which is used in the frame-by-frame motion compensation coding process for a non-interlaced shape signal indicating a shape of the object included in the image signal in macroblock units, based on its prediction value, wherein:

the prediction value of the shape motion vector of a target macroblock to be coded is generated with reference to a shape motion vector and a color motion vector of a coded macroblock when the image signal is the non-interlaced image signal; and the prediction value of the shape motion vector of the target macroblock is generated with reference to the shape motion vector of the coded macroblock when the image signal is the interlaced image signal.

10. An image decoding method for decoding a coded image signal of an interlaced image signal corresponding to an object included in an image space in macroblock units each comprising a predetermined number of pixels into which the image space is divided, by performing an adaptive decoding process including a frame-by-frame motion compensation decoding process and a field-by-field motion compensation decoding process, said method comprising:

a shape motion vector decoding for decoding a shape motion vector which is used in a frame-by-frame motion compensation decoding process for a coded signal of an interlaced shape signal indicating a shape of the object included in the image signal in macroblock units, based on its prediction value; and a color motion vector conversion for converting field-basis color motion vectors used in a field-by-field motion compensation decoding process for a coded signal of an interlaced color signal for color display of the object included in the image space into a frame-basis color motion vector, wherein:

in said shape motion vector decoding, the prediction value of the shape motion vector of a target macroblock to be decoded is generated with reference to a frame-basis color motion vector obtained by converting a color motion vector of a coded macroblock in said color motion vector conversion when the prediction value is generated with reference to the shape motion vector and the color motion vector of the coded macroblock and the color motion vector of the coded macroblock is the field-basis motion vector.

11. An image decoding method for decoding a coded image signal of an interlaced image signal corresponding to an object included in an image space in macroblock units each comprising a predetermined number of pixels into which the image space is divided, by performing an adaptive decoding process including a frame-by-frame motion compensation decoding process and a field-by-field motion compensation decoding process, said method comprising:

a color motion vector decoding for decoding either a frame-basis color motion vector or a field-basis color motion vector which is used in either a frame-by-frame motion compensation decoding process or a field-by-field motion compensation decoding process for a coded signal of an interlaced color signal for color display of the object included in the image signal in macroblock units, based on its prediction value; and a shape motion vector decoding for decoding a shape motion vector which is used in the frame-by-frame motion compensation decoding process for a coded signal of an interlaced shape signal indicating a shape of the object included in the image signal in macroblock units, based on its prediction value, wherein:

the prediction value of the shape motion vector of a target macroblock to be decoded is generated with reference to a shape motion vector and a color motion vector of a decoded macroblock when the color motion vector of the decoded macroblock is the frame-basis motion vector, and the prediction value of the shape motion vector of the target macroblock is generated with reference to the shape motion vector of the decoded macroblock when the color motion vector of the decoded macroblock is the field-basis motion vector.

12. An image decoding method for decoding a coded image signal of an interlaced image signal or a non-interlaced image signal corresponding to an object included in an image space in macroblock units each comprising a predetermined number of pixels into which the image space is divided, by performing an adaptive decoding process including a frame-by-frame motion compensation decoding process and a field-by-field motion compensation decoding process, said method comprising:

a color motion vector decoding for decoding either a frame-basis color motion vector or a field-basis color motion vector which is used in either a frame-by-frame motion compensation decoding process or a field-by-field motion compensation decoding process for a coded signal of a color signal for color display of the object included in the image signal in macroblock units, based on its prediction value; and a shape motion vector decoding for decoding a shape motion vector which is used in the frame-by-frame motion compensation decoding process for a coded signal of a non-interlaced shape signal indicating a shape of the object included in the image signal in macroblock units, based on its prediction value, wherein:

the prediction value of the shape motion vector of a target macroblock to be decoded is generated with reference to a shape motion vector and a color motion vector of a decoded macroblock when the coded image signal is the coded image signal of the non-interlaced image signal; and the prediction value of the shape motion vector of the target macroblock is generated with reference to the shape motion vector of the decoded macroblock when the coded image signal is the coded image signal of the interlaced image signal.

13. A data storage medium for storing an image processing program, said program being a coding program which is operable to make a computer perform a coding process according to an image coding method of claim 7.

14. A data storage medium for storing an image processing program, said program being a coding program which is operable to make a computer perform a coding process according to an image coding method of claim 8.

15. A data storage medium for storing an image processing program, said program being a coding program which is operable to make a computer perform a coding process according to an image coding method of claim 9.

16. A data storage medium for storing an image processing program, said program being a decoding program which is operable to make a computer perform a decoding process according to an image decoding method of claim 10.

17. A data storage medium for storing an image processing program, said program being a decoding program which is operable to make a computer perform a decoding process according to an image decoding method of claim 11.

18. A data storage medium for storing an image processing program, said program being a decoding program which is operable to make a computer perform a decoding process according to an image decoding method of claim 12.

* * * * *